US008965762B2

(12) United States Patent
Song et al.

(10) Patent No.: US 8,965,762 B2
(45) Date of Patent: Feb. 24, 2015

(54) BIMODAL EMOTION RECOGNITION METHOD AND SYSTEM UTILIZING A SUPPORT VECTOR MACHINE

(75) Inventors: Kai-Tai Song, Hsinchu (TW); Meng-Ju Han, Taipei County (TW); Jing-Huai Hsu, Taipei County (TW); Jung-Wei Hong, Hsinchu (TW); Fuh-Yu Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1054 days.

(21) Appl. No.: 13/022,418

(22) Filed: Feb. 7, 2011

(65) Prior Publication Data

US 2011/0141258 A1 Jun. 16, 2011

Related U.S. Application Data

(63) Continuation-in-part of application No. 11/835,451, filed on Aug. 8, 2007, now abandoned.

(30) Foreign Application Priority Data

Feb. 16, 2007 (TW) .............................. 096105996 A

(51) Int. Cl.
*G10L 25/51* (2013.01)
*G10L 25/63* (2013.01)
(Continued)

(52) U.S. Cl.
CPC ................. *G10L 17/26* (2013.01); *G10L 25/63* (2013.01); *G06K 9/00268* (2013.01)
USPC ............ 704/236; 704/231; 704/270; 382/118

(58) Field of Classification Search
CPC ......... G10L 25/51; G10L 25/63; G10L 25/66; G06K 9/00221; G06K 9/00302
USPC ........................... 704/231, 236, 270; 382/118
See application file for complete search history.

(56) References Cited

U.S. PATENT DOCUMENTS 6,681,032 B2   1/2004   Bortolussi et al.
6,697,504 B2   2/2004   Tsai
(Continued)

FOREIGN PATENT DOCUMENTS

TW   420939   2/2001
TW   505892   10/2002

OTHER PUBLICATIONS

Hoch, S., et al. "Bimodal fusion of emotional data in an automotive environment." Acoustics, Speech, and Signal Processing, 2005. Proceedings.(ICASSP'05). IEEE International Conference on. vol. 2. IEEE, Mar. 2005, pp. 1085-1088.*

(Continued)

*Primary Examiner* — James Wozniak
(74) *Attorney, Agent, or Firm* — WPAT, PC; Justin King

(57) ABSTRACT

A method is disclosed in the present disclosure for recognizing emotion by setting different weights to at least of two kinds of unknown information, such as image and audio information, based on their recognition reliability respectively. The weights are determined by the distance between test data and hyperplane and the standard deviation of training data and normalized by the mean distance between training data and hyperplane, representing the classification reliability of different information. The method recognizes the emotion according to the unidentified information having higher weights while the at least two kinds of unidentified information have different result classified by the hyperplane and correcting wrong classification result of the other unidentified information so as to raise the accuracy while emotion recognition. Meanwhile, the present disclosure also provides a learning step with a characteristic of higher learning speed through an algorithm of iteration.

28 Claims, 21 Drawing Sheets

(51) Int. Cl.
*G10L 17/26* (2013.01)
*G06K 9/00* (2006.01)

(56) References Cited

U.S. PATENT DOCUMENTS

| | | | |
|---|---|---|---|
| 6,754,560 B2* | 6/2004 | Fujita et al. | 700/245 |
| 6,879,709 B2 | 4/2005 | Tian et al. | |
| 2002/0062297 A1 | 5/2002 | Mizokawa | |
| 2002/0069036 A1 | 6/2002 | Mizokawa | |
| 2002/0158599 A1* | 10/2002 | Fujita et al. | 318/568.11 |
| 2003/0004652 A1 | 1/2003 | Brunner et al. | |
| 2003/0110038 A1* | 6/2003 | Sharma et al. | 704/270 |
| 2003/0148295 A1 | 8/2003 | Wan et al. | |
| 2003/0225526 A1 | 12/2003 | Golub et al. | |
| 2004/0005086 A1 | 1/2004 | Wolff et al. | |
| 2004/0024298 A1 | 2/2004 | Marshik-Geurts et al. | |
| 2005/0022168 A1 | 1/2005 | Zhu et al. | |
| 2005/0102246 A1 | 5/2005 | Movellan et al. | |
| 2005/0144013 A1* | 6/2005 | Fujimoto et al. | 704/277 |
| 2005/0255467 A1 | 11/2005 | Adorjan et al. | |
| 2007/0202515 A1 | 8/2007 | Hadlock et al. | |
| 2007/0250301 A1 | 10/2007 | Vaisberg et al. | |
| 2007/0255755 A1 | 11/2007 | Zhang et al. | |
| 2008/0010065 A1 | 1/2008 | Bratt et al. | |
| 2008/0201144 A1* | 8/2008 | Song et al. | 704/236 |
| 2009/0074259 A1 | 3/2009 | Baltatu et al. | |
| 2009/0265134 A1 | 10/2009 | Sambasivan et al. | |
| 2010/0278385 A1* | 11/2010 | Song et al. | 382/103 |

OTHER PUBLICATIONS

Chan, Jhen-yang. "Vision Servo Batting by Distributed Control System of DSP Machine Vision and Robot Manipulator." 2009, pp. 1-2.*

Das, Sauvik, et al. "Voice and facial expression based classification of emotion using linear support vector machine." Developments in eSystems Engineering (DESE), 2009 Second International Conference on. IEEE, Dec. 2009, pp. 377-384.*

Gavat, Inge, et al. "Enhancing robustness of speech recognizers by bimodal features." Facta universitatis-series: Electronics and Energetics 19.2, Aug. 2006, pp. 287-298.*

Grigoryan, Vahan. Multimodal Biometric Analysis for Monitoring of Wellness. Diss. University of Pittsburgh, 2004, pp. 1-70.*

Han, Meng-Ju, et al. "A New Information Fusion Method for Bimodal Robotic Emotion Recognition." Journal of Computers 3.6, Jul. 2008, pp. 39-47.*

Joo, Young Hwan, et al. "Real-Time Face Recognition for Mobile Robots." International Conference on Ubiquitous Robots and Ambient Intelligence v. no. pp. vol. 43. KROS, 2005, pp. 43-47.*

Metternich, Michael, . "Bimodal Affect Recognition.", Dec. 2006, pp. 1-61.*

Jain et al, Score normalization in multimodal biometric systems, 2005, Pattern Recognition , Elsevier Ltd.

Chuang et al, Multi-Modal Emotion Recognition from Speech and Text, Aug. 2004, Computational Linguistics and Chinese Language Processing, vol. 9, No. 2, pp. 45-62.

Burges, A Tutorial on Support Vector Machines for Pattern Recognition, 1998, Kluwer Academic Publishers, pp. 1-43.

Chien-Feng Wu, Bimodal Emotion Recognition from Speech and Facial Expression; Jul. 23, 2002; Dept. of Computer Science and Information Engineering Nation Cheng Kung University, Tainan, Taiwan, ROC.

Busso et al, Analysis of Emotion Recognition using Facial Expressions, Speech and Multimodal Information, Oct. 2004, ICMI'04, State College, Pennsylvania.

* cited by examiner

BIMODAL EMOTION RECOGNITION METHOD AND SYSTEM UTILIZING A SUPPORT VECTOR MACHINE

This application is a continuation-in-part of the pending application with application Ser. No. 11/835,451 filed on Aug. 8, 2007.

BACKGROUND

1. Field of the Disclosure

The present disclosure relates to an emotion recognition method and system thereof. And more particularly, to an emotion recognition algorithm capable of assigning different weights to at least two feature sets of different types based on their respectively recognition reliability while making an evaluation according to the recognition reliability to select feature sets of higher weight among those weighted feature sets to be used for classification, and moreover, it is capable of using a rapid calculation means to train and adjust hyperplanes established by Support Vector Machine (SVM) to be used as a learning process for enabling the adjusted hyperplanes to be used for identifying new and unidentified feature sets accurately.

2. Description of Related Art

For enabling a robot to interact with a human and associate its behaviors with the interaction, it is necessary for the robot to have a reliable human-machine interface that is capable of perceiving its surrounding environment and recognizing inputs from human, and thus basing upon the interaction, to perform desired tasks in unstructured environments without continuous human guidance. In a real world, emotion plays a significant role in rational actions in human communication. Given the potential and importance of emotions, in recent years, there has been growing interest in the study of emotions to improve the capabilities of current human-robot interaction. A robot that can respond to human emotions and act correspondingly is no longer an ice-cold machine, but a partner that can exhibit comprehensible behaviors and is entertaining to interact with. Thus, robotic pets with emotion recognition capability are just like real pets, which are capable of providing companionship and comfort in a nature manner, but without the moral responsibilities involved in caring a real animal.

For facilitating nature interactions between robots and human beings, most robots are designed with emotion recognition system so as to respond to human emotions and act corresponding thereto in an autonomous manner. Most of the emotion recognition methods current available can receive only one type of input from human being for emotion recognition, that is, they are programmed to perform either in a speech recognition mode or a facial expression recognition mode. One such research is a multi-level facial image recognition method disclosed in U.S. Pat. No. 6,697,504, entitled "Method of Multi-level Facial Image Recognition and System Using the Same". The abovementioned method applies a quadrature mirror filter to decompose an image into at least two sub-images of different resolution. These decomposed sub-images pass through self-organizing map neural networks for performing non-supervisory classification learning. In a test stage, the recognition process is performed from sub-images having a lower resolution. If the image can not be identified in this low resolution, the possible candidates are further recognized in a higher level of resolution. Another such research is a facial verification system disclosed in U.S. Pat. No. 6,681,032, entitled "Real-Time Facial Recognition and Verification System". The abovementioned system is capable of acquiring, processing and comparing an image with a stored image to determine if a match exists. In particular, the system employs a motion detection stage, blob stage and a flesh tone color matching stage at the input to localize a region of interest (ROI). The ROI is then processed by the system to locate the head, and then the eyes, in the image by employing a series of templates, such as eigen templates. The system then thresholds the resultant eigen image to determine if the acquired image matches a pre-stored image.

In addition, a facial detection system is disclosed in U.S. Pat. No. 6,689,709, which provides a method for detecting neutral expressionless faces in images and video, if neutral faces are present in the image or video. The abovementioned system comprises: an image acquisition unit; a face detector, capable of receiving input from the image acquisition unit for detecting one or more face sub-images of one or more faces in the image; a characteristic point detector, for receiving input from the face detector to be use for estimating one or more characteristic facial features as characteristic points in each detected face sub-image; a facial feature detector, for detecting one or more contours of one or more facial components; a facial feature analyzer, capable of determining a mouth shape of a mouth from the contour of the mouth and creating a representation of the mouth shape, the mouth being one of the facial components; and a face classification unit, for classifying the representation into one of a neutral class and a non-neutral class. It is noted that the face classification unit can be a neural network classifier or a nearest neighbor classifier. Moreover, a face recognition method disclosed in U.S. Pub. No. 2005102246, in which first faces in an image are detected by AdaBoost algorithm, and then face features of the detected faces are identified by the use of Gabor filter so that the identified face features are fed to a classifier employing support vector machine to be used for facial expression recognition. It is known that most of the emotion recognition studies in Taiwan are focused in the filed of face detection, such as those disclosed in TW Pat. No. 505892 and 420939.

SUMMARY OF THE DISCLOSURE

The disclosure provides an emotion recognition method capable of utilizing at least two feature sets for identifying emotions while verifying the identified emotions by a specific algorithm with a computing unit so as to enhance the accuracy of the emotion recognition.

The disclosure further provides an emotion recognition method, which first establishes hyperplanes by Support Vector Machine (SVM) and then assigns different weights to at least two feature sets of an unknown data based on their respectively recognition reliability acquired from the distances and distributions of an unknown data with respect to the established hyperplanes, thereby, feature set of higher weight among those weighted feature sets is selected and defined to be the correct recognition and is used for correcting others being defined as incorrect.

The disclosure further provides an emotion recognition method embedded with a learning step characterized by high learning speed, in which the learning step functions to adjust parameters of hyperplanes established by SVM instantaneously so as to increase the capability of the hyperplane for identifying the emotion from an unidentified information accurately.

The disclosure further provides an emotion recognition method, in which a way of Gaussian kernel function for space transformation is provided in the learning step and used while the difference between an unknown data and an original training data is too big so that the stability of accuracy is capable of being maintained.

The disclosure further provides an emotion recognition method, which groups two emotion categories as a classification set while designing an appropriate criterion by performing a difference analysis upon the two emotion categories so as to determine which feature values to be used for emotion recognition and thus achieve high recognition accuracy and speed.

The present disclosure further provides an emotion recognition method, comprising the steps of: (a) establishing at least two hyperplanes, each capable of defining two emotion categories; (b) inputting at least two unknown data to be identified in correspondence to the at least two hyperplanes while enabling each unknown data to correspond to one emotion category selected from the two emotion categories of the hyperplane corresponding thereto; (c) respectively performing a calculation process upon the two unknown data for assigning each with a weight; and (d) comparing the assigned weight of the two unknown data while using the comparison as base for selecting one emotion category out of those emotion categories as an emotion recognition result.

In an exemplary embodiment of the disclosure, each of the two emotion categories is an emotion selected from the group consisting of happiness, sadness, surprise, neutral and anger.

In an exemplary embodiment of the disclosure, the establishing of one of the hyperplanes in the emotion recognition method comprises the steps of: (a1) establishing a plurality of training samples; and (a2) using a means of support vector machine (SVM) to establish the hyperplanes basing upon the plural training samples. Moreover, the establishing of the plural training samples further comprises the steps of: (a11) selecting one emotion category out of the two emotion categories; (a12) acquiring a plurality of feature values according to the selected emotion category so as to form a training sample; (a13) selecting another emotion category; (a14) acquiring a plurality of feature values according to the newly selected emotion category so as to form another training sample; and (a15) repeating steps (a13) to (a15) and thus forming the plural training samples.

In an exemplary embodiment of the disclosure, the unknown data comprises an image data stored in a memory unit collected by an audio sensor and a vocal data captured by an image sensor, in which the image data is an image selected from the group consisting of facial images. Moreover, the facial image is comprised of a plurality of feature values, each being defined as the distance between two specific features detected in the facial image. In addition, the vocal data is comprised of a plurality feature values, each being defined as the combination of pitch and energy.

In an exemplary embodiment of the disclosure, the calculation process performing with a computing unit is comprised of the steps of: basing upon the plural training samples used for establishing the corresponding hyperplane to acquire the standard deviation of the plural training samples and the mean distance between the plural training samples and the hyperplane; respectively calculating feature distances between the hyperplane and the at least two unknown data, with the audio sensor and the image sensor, to be identified; and obtaining the weights of the at least two unknown data by performing a mathematic operation upon feature distances, the plural training samples, the mean distance and the standard deviation. In addition, the mathematic operation further comprises the steps of: obtaining the differences between the feature distances and the standard deviation; and normalizing the differences for obtaining the weights.

In an exemplary embodiment of the disclosure, the acquiring of weights of step (c) further comprises the steps of: (c1) basing on the hyperplanes corresponding to the two unknown data to determine whether the two unknown data are capable of being labeled to a same emotion category; and (c2) respectively performing the calculation process upon the two unknown data for assigning each with a weight while the two unknown data are not of the same emotion category.

In an exemplary embodiment of the disclosure, the emotion recognition method further comprises a step of: (e) performing a learning process with respect to a new unknown data for updating the hyperplanes. Moreover, the step (e) further comprises the steps of: (e1) acquiring a parameter of the hyperplane to be updated; and (e2) using feature values detected from the unknown data and the parameter to update the hyperplanes through an algorithm of iteration.

To achieve the above objects, the present disclosure provides an emotion recognition method, comprising the steps of: (a') providing at least two training samples, each being defined in a specified characteristic space established by performing a transformation process upon each training sample with respect to its original space; (b') establishing at least two corresponding hyperplanes in the specified characteristic spaces of the at least two training samples, each hyperplane capable of defining two emotion categories; (c') inputting at least two unknown data to be identified in correspondence to the at least two hyperplanes, and transforming each unknown data to its corresponding characteristic space by the use of the transformation process while enabling each unknown data to correspond to one emotion category selected from the two emotion categories of the hyperplane corresponding thereto; (d') respectively performing a calculation process upon the two unknown data for assigning each with a weight; and (e') comparing the assigned weight of the two unknown data while using the comparison as base for selecting one emotion category out of those emotion categories as an emotion recognition result.

In an exemplary embodiment of the disclosure, the emotion recognition method further comprises a step of: (f') performing a learning process with respect to a new unknown data for updating the hyperplanes. Moreover, the step (f') further comprises the steps of: (f1') acquiring a parameter of the hyperplane to be updated; (f2') transforming the new unknown data into its corresponding characteristic space by the use of the transformation process; and (f3') using feature values detected from the unknown data and the parameter to update the hyperplanes through an algorithm of iteration.

In an exemplary embodiment of the disclosure, the emotion recognition method further comprises a method of fast training of the SVM when updating the hyperplane. When performing a learning process with respect to a new unknown data for updating the hyperplane, a critical set is determined by using fixed number of samples close to the hyperplane.

In an exemplary embodiment of the disclosure, the parameter of the hyperplane is the normal vector thereof.

In an exemplary embodiment of the disclosure, the transformation process is a Gaussian Kernel transformation.

The disclosure further provides an emotion recognition system, which comprises an audio sensor, an image sensor, a memory unit, and a computing unit. The audio sensor collects vocal data. The image sensor captures image data and the image data is written into the memory unit. The computing unit reads the vocal data from the audio sensor and the image data from the memory unit for face detection, feature gathering and emotion recognition.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
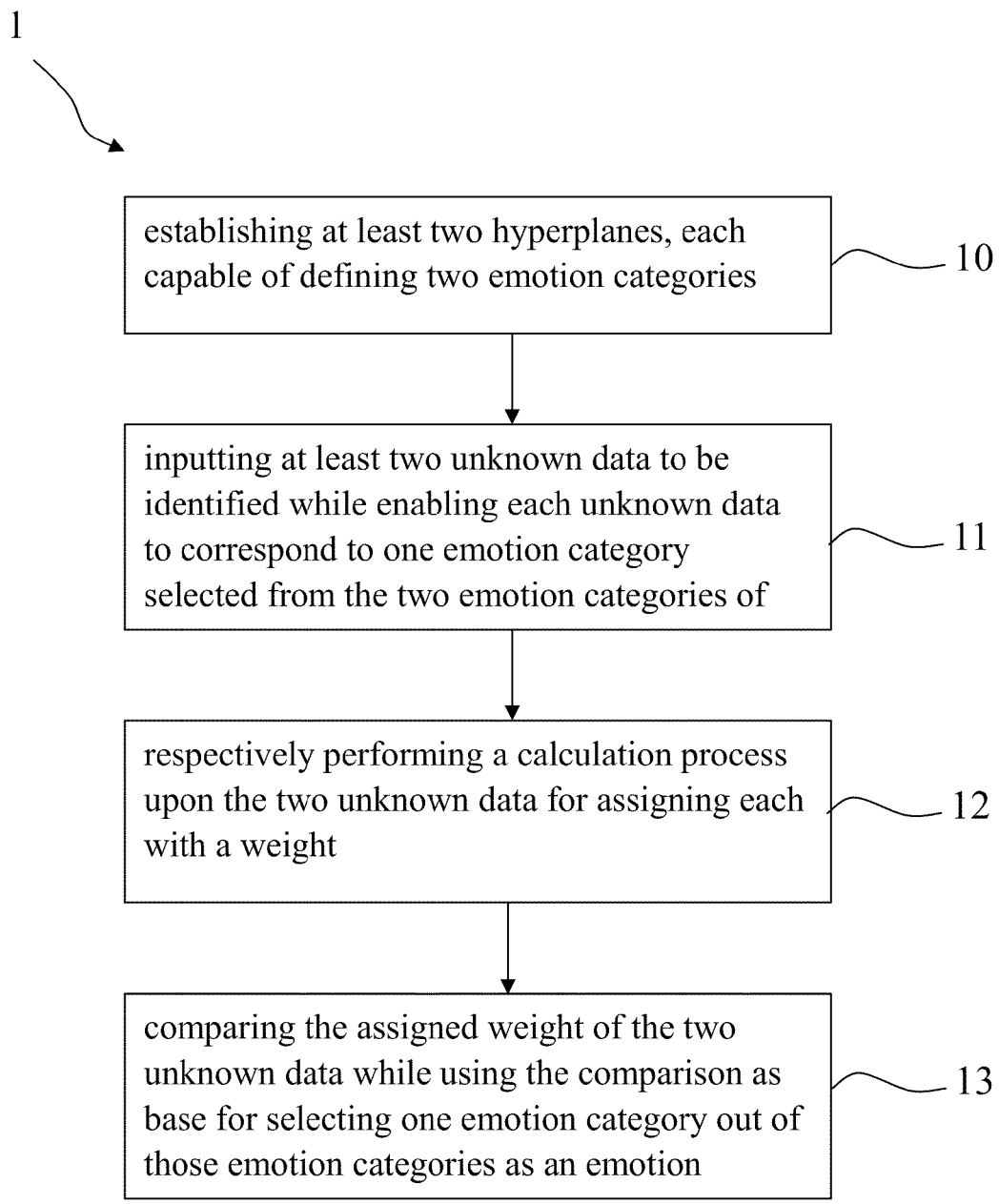
FIG. 1 is a flow chart depicting steps of an emotion recognition method according to a first embodiment of the disclosure.

Please refer to FIG. 1, which is a flow chart depicting steps for establishing hyperplanes used in the emotion recognition method of the disclosure. The flow of FIG. 1 starts from step 10. At step 10, at least two hyperplanes are established in a manner that each hyperplane is capable of defining two emotion categories, and then the flow proceeds to step 11. It is noted that each emotion categories is an emotion selected from the group consisting of happiness, sadness, surprise, neutral and anger, but is not limited thereby. With regard to the process for establishing the aforesaid hyperplanes, please refer to the flow chart shown in FIG. 2A. The flow for establishing hyperplanes starts from step 100. At step 100, a plurality of training samples are first being established, and then the flow proceeds to step 101. In an exemplary embodiment, there can be at least two types of training samples, which are image data and vocal data. It is known that the image data substantially can be a facial image or a gesture image. For simplicity, only facial images are to be used as image training samples in the embodiments of the disclosure hereinafter.

As there are facial image data and vocal data, it is required to have a system for fetching and establishing such data. Please refer to FIG. 3, which shows an emotion recognition system structured for realizing the emotion recognition method of the disclosure. The system 2 is divided into three parts, which are a vocal feature acquisition unit 20, an image feature acquisition unit 21 and a recognition unit 22.

In the vocal feature acquisition unit 20, a speech of certain emotion, being captured and inputted into the system 2 as an analog signal by the microphone 200, is fed to the audio frame detector 201 to be sampled and digitized into a digital signal. It is noted that as the whole analog signal of the speech not only include a section of useful vocal data, but also include silence sections and noises, it is required to use the audio frame detector to detect the starting and ending of the useful vocal section and then frame the section. After the vocal section is framed, the vocal feature analyzer 200 is used for calculating and analyzing emotion features contained in each frame, such as the pitch and energy. As there can be more than one frame existed in a section of useful vocal data, by statistical analyzing pitches and energies of all those frames, several feature values can be concluded and used for defining the vocal data. In an exemplary embodiment of the disclosure, there are 12 feature values described and listed in Table 1, but are not limited thereby.

TABLE 1

Twelve feature values for defining a vocal data

| | |
|---|---|
| Pitch | 1. Pave: average pitch |
| | 2. Pstd: standard deviation of pitch |
| | 3. Pmax: maximum pitch |
| | 4. Pmin: minimum pitch |
| | 5. PDave: average of pitch gradient variations |
| | 6. PDstd: standard deviation of pitch gradient variations |
| | 7. PDmax: maximum pitch gradient variation |
| Energy | 8. Eave: average energy |
| | 9. Estd: standard deviation of energies |
| | 10. Emax: maximum energy |
| | 11. Edave: average of energy gradient variations |
| | 12. EDstd: standard deviation of energy gradient variations |

In the image feature acquisition unit 21, an image containing a human face, being detected by the image detector 210, are fed to the image processor 211 where the human face can be located according to formula of flesh tone color and facial specs embedded therein. Thereafter, the image feature analyzer 212 is used for detecting facial feature points from the located human face and then calculating feature values accordingly. In an embodiment of the disclosure, the feature points of a human face are referred as the positions of eyebrow, pupil, eye, and lip, etc. After all the feature points, including those from image data and vocal data, are detected, they are fed to the recognition unit 22 for emotion recognition as the flow chart shown in FIG. 1.

Figure 2B:
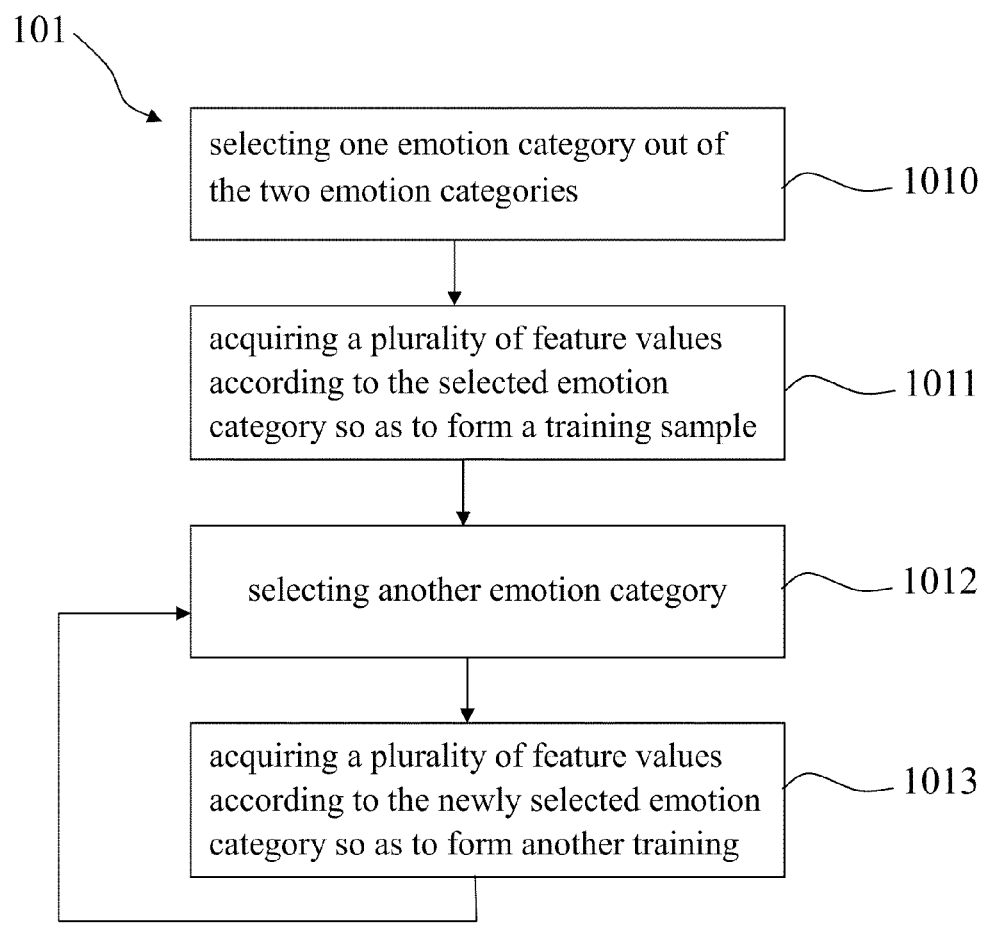
FIG. 2B is a flow chart depicting steps for establishing training samples used in the emotion recognition method of the disclosure.
Figure 3:
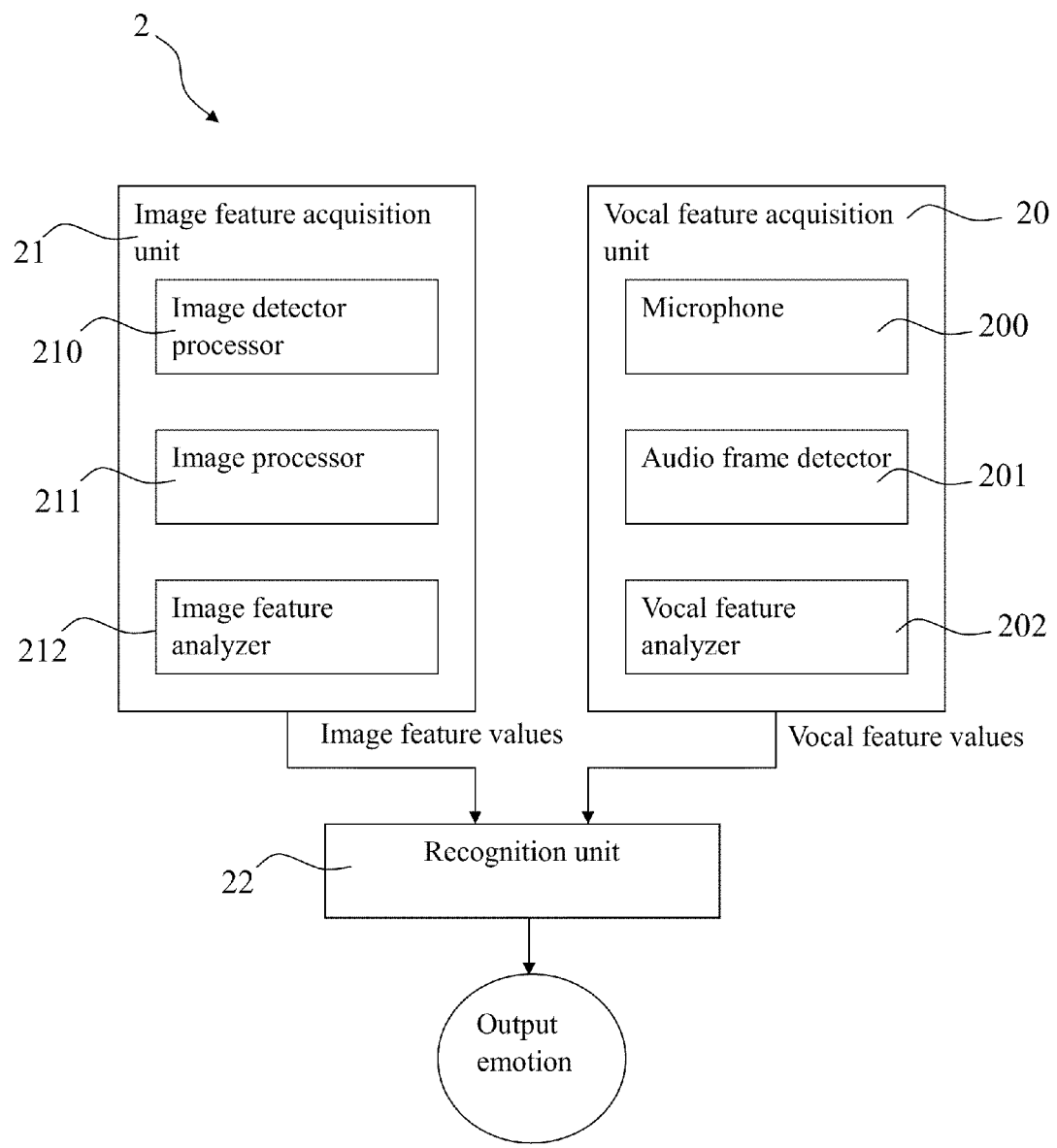
FIG. 3 shows an emotion recognition system structured for realizing the emotion recognition method of the disclosure.

By the system of FIG. 3, process for establishing training samples can be proceeded. Please refer to FIG. 2B, which is a flow chart depicting steps for establishing training samples used in the emotion recognition method of the disclosure. The flow starts at step 1010. At step 1010, one emotion category out of the two emotion categories is selected, which the selected emotion can be happiness, sadness, or anger, etc; and then the flow proceeds to step 1011. At step 1011, by the use of the abovementioned vocal feature acquisition unit 20 and image feature acquisition unit 21, a plurality of feature values are acquired according to the selected emotion category so as to form a training sample, whereas the formed training sample is comprised of the combinations of pitch and energy in the vocal data, and the distance between any two specific facial feature points detected in the image data; and then the flow proceeds to step 1012. At step 1012, another emotion category is selected, and then the flow proceeds to step 1013. At step 1013, another training sample is established according to the newly selected emotion category similar to that depicted in step 1011. Thereafter, by repeating step 1012 and step 1013, a plurality of training samples can be established.

Figure 4:
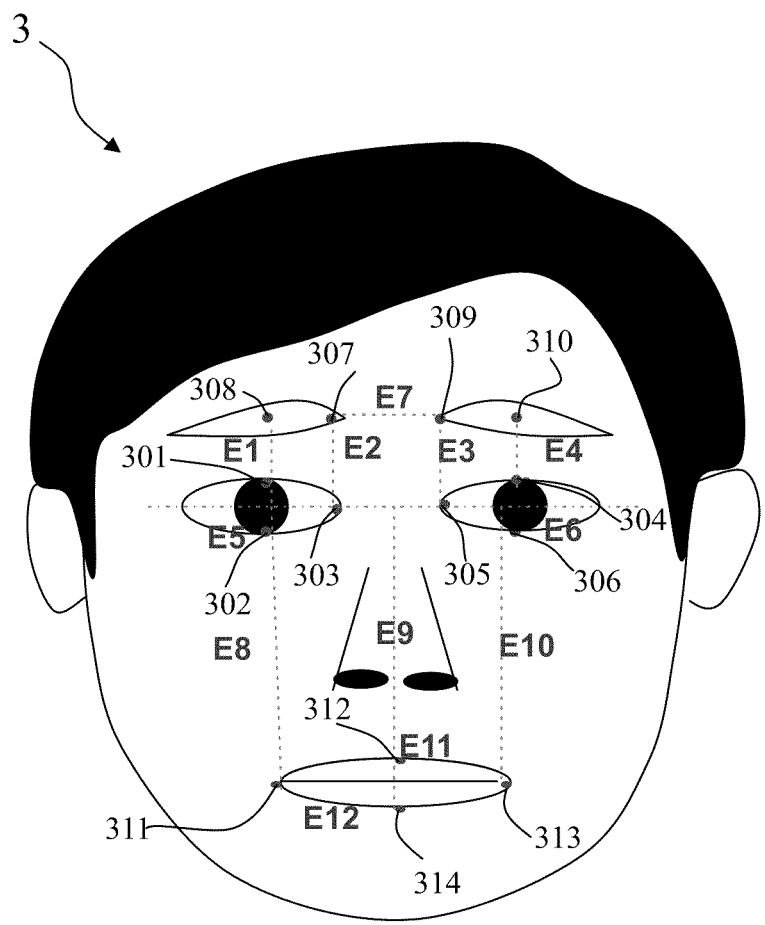
FIG. 4 is a schematic diagram showing a human face and a plurality of feature points detected therefrom.

Please refer to FIG. 4, which is a schematic diagram showing a human face and a plurality of image feature points detected therefrom. To search the positions of features on the upper part of a face by the use of the recognition system 2 of FIG. 3, the pupil of an eye can be located by assuming the pupil is the darkest area. Furthermore, by the position of the pupil, one can identify possible areas where the corresponding eye and eyebrow can be presented, and then feature points of the eye and eyebrow can be extracted by the use of gray level and edge detection. In addition, in order to find the feature points relating to lips, the system 2 employ integral optical intensity (IOD) with respect to the common geometry of the human face. It is noted that the method used for extracting feature points is known to those skilled in the art, and thus is not described further herein. In the embodiment shown in FIG. 4, there are 14 feature points 301~314 being extracted, which are three feature points 301~303 for the right eye, three feature points 304~306 for the left eye, two feature points 307, 308 for the right eyebrow, two feature points 309, 310 for the left eyebrow, and four feature points 311~314 for the lip. After all those feature points are detected, image feature values, each being defined as the distance between two feature points, can be obtained and used for emotion recognition, as facial expression can be represented by the positions of its eyes, eyebrows and lips as well as the size and shape variations thereof. Table 2 lists twelve image feature values obtained from the abovementioned 14 feature points.

TABLE 2

The list of 12 image feature values

| | |
|---|---|
| E1 | Distance between center points of right eyebrows and |
| E2 | Distance between edges of right eyebrows and eyes |
| E3 | Distance between edges of left eyebrows and eyes |
| E4 | Distance between center points of left eyebrows and left |
| E5 | Distance between upper and lower edges of right eye |

TABLE 2-continued

The list of 12 image feature values

| | |
|---|---|
| E6 | Distance between upper and lower edges of left eye |
| E7 | Distance between right and left eyebrows |
| E8 | Distance between right lip and right eye |
| E9 | Distance between upper lip and two eyes |
| E10 | Distance between left lip and left eye |
| E11 | Distance between upper and lower lips |
| E12 | Distance between right and left edges of lips |

It is noted that the size of a human face seen in the image detector can be varied with respect to the distance between the two, and the size of the human face will greatly affect the feature values obtained therefrom. Thus, it is intended to normalize the feature values so as to minimize the affect caused by the size of the human face detected by the image sensor. In this embodiment, as the distance between feature points 303 and 305 is regarded as a constant, normalized feature values can be obtained by dividing every feature value with this constant.

Figure 5A:
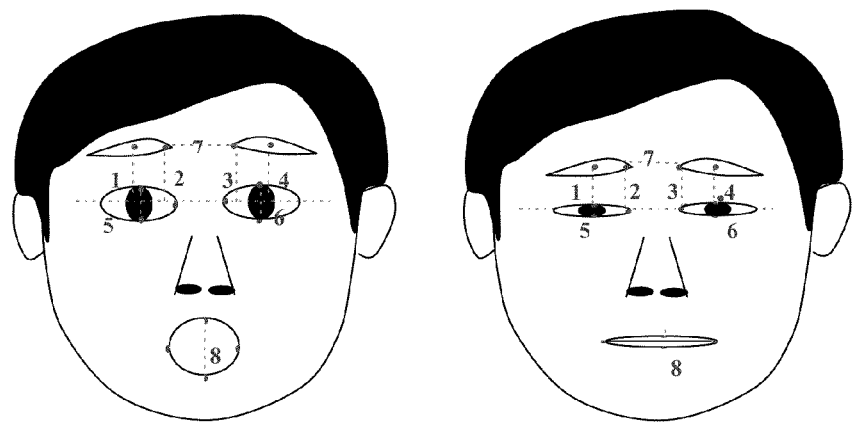
FIG. 5A~FIG. 5J shows a variety of facial expressions representing different human emotions while each facial expression is defined by the relative positioning of feature points.
Figure 5B:
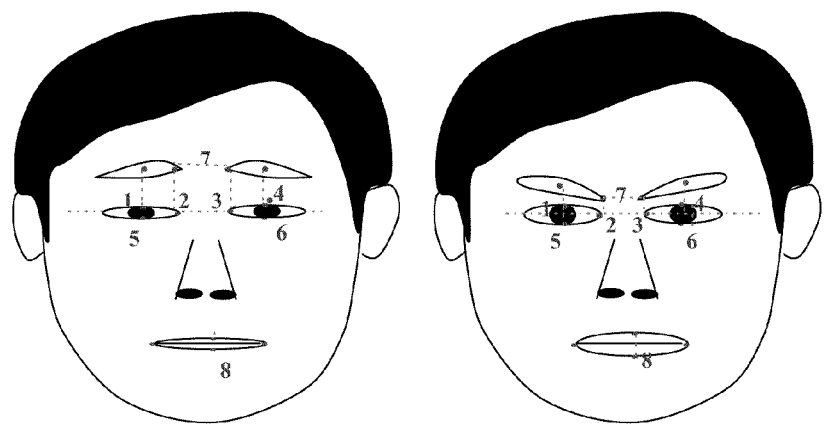
Figure 5C:
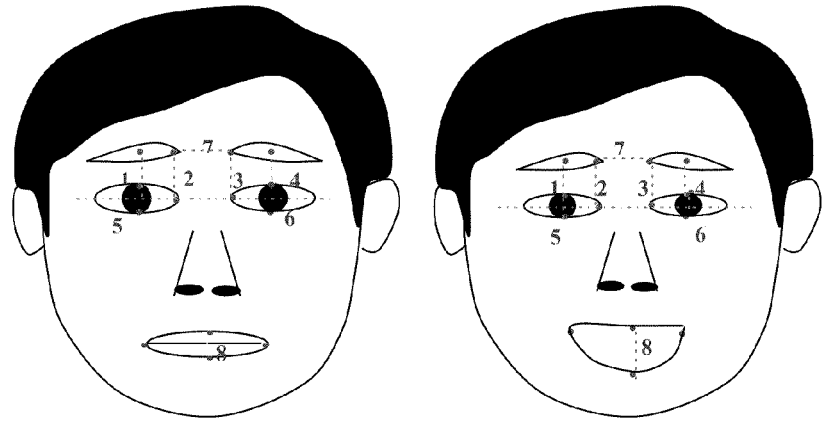
Figure 5D:
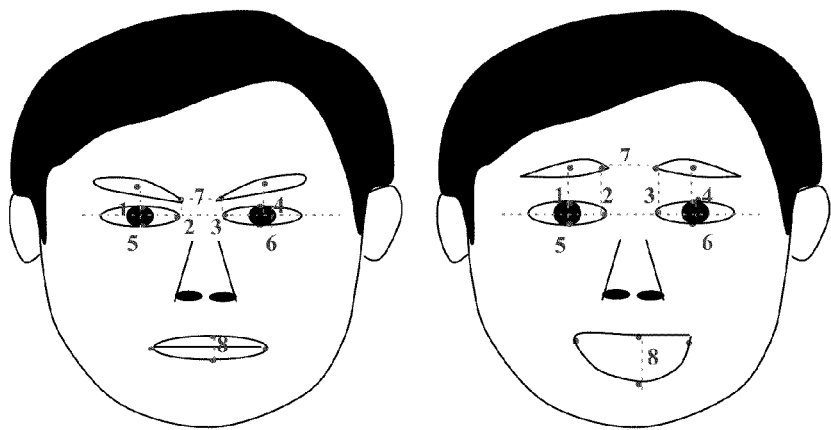

In an embodiment of the disclosure, one can select several feature values out of the aforesaid 12 feature values as key feature values for emotion recognition. For instance, the facial expressions shown in FIG. 5A→FIG. 5D are evaluated by the eight feature values listed in Table 3. It is because that the variations in distance between eyebrows, the size of eyes and the level of lips are more obvious. FIG. 5A shows a comparison between a surprise facial expression and a sad facial expression. FIG. 5B shows a comparison between a sad facial expression and an angry facial expression. FIG. 5C shows a comparison between a neutral facial expression and a happy facial expression. FIG. 5D shows a comparison between an angry facial expression and a happy facial expression.

TABLE 3

Key feature values for facial expressions of FIG. 5A~FIG. 5D

| | |
|---|---|
| 1 | Distance between center points of right eyebrows and |
| 2 | Distance between edges of right eyebrows and eyes |
| 3 | Distance between edges of left eyebrows and eyes |
| 4 | Distance between center points of left eyebrows and left |
| 5 | Distance between upper and lower edges of right eye |
| 6 | Distance between upper and lower edges of left eye |
| 7 | Distance between right and left eyebrows |
| 8 | Distance between upper and lower lips |

Figure 5E:
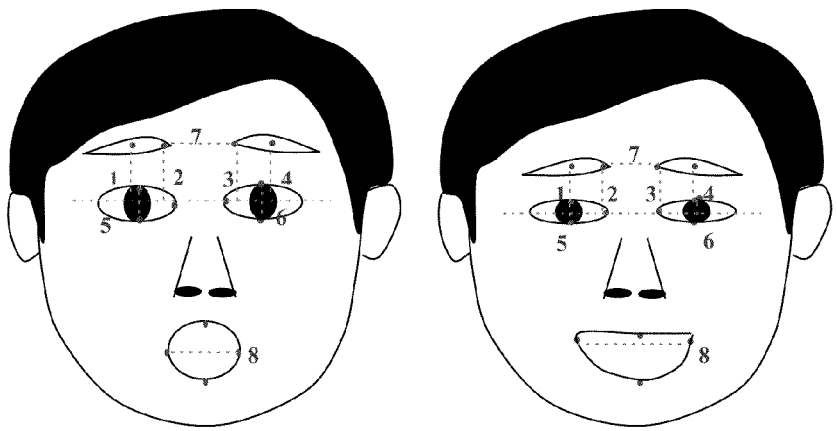

Moreover, the facial expression shown in FIG. 5E is evaluated by the eight feature values listed in Table 4, in which, instead of E11 of distance between upper and lower lips, E12 of distance between right and left edges of lips is adopted, while other remain unchanged, since the difference in a happy face and a surprise face is mainly distinguishable by the width of lips. FIG. 5E shows a comparison between a surprise facial expression and a happy facial expression.

TABLE 4

Key feature values for facial expressions of FIG. 5E

| | |
|---|---|
| 1 | Distance between center points of right eyebrows and |
| 2 | Distance between edges of right eyebrows and eyes |
| 3 | Distance between edges of left eyebrows and eyes |
| 4 | Distance between center points of left eyebrows and left |
| 5 | Distance between right and left eyebrows |
| 6 | Distance between upper and lower edges of left eye |
| 7 | Distance between right and left eyebrows |
| 8 | Distance between right and left edges of lips |

Figure 5F:
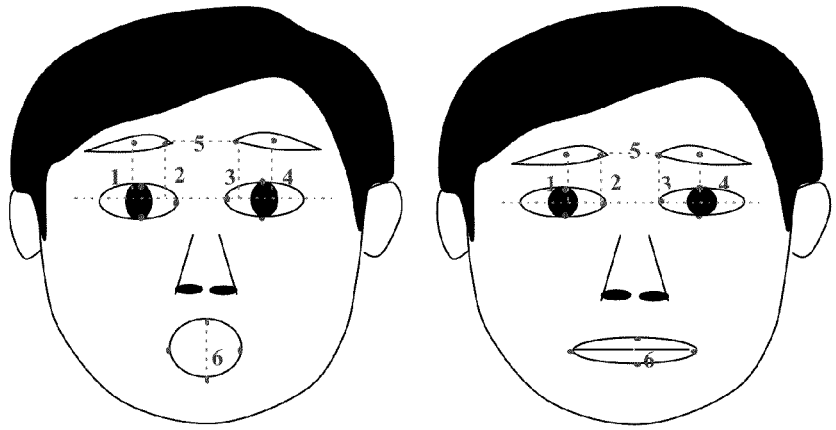
Figure 5G:
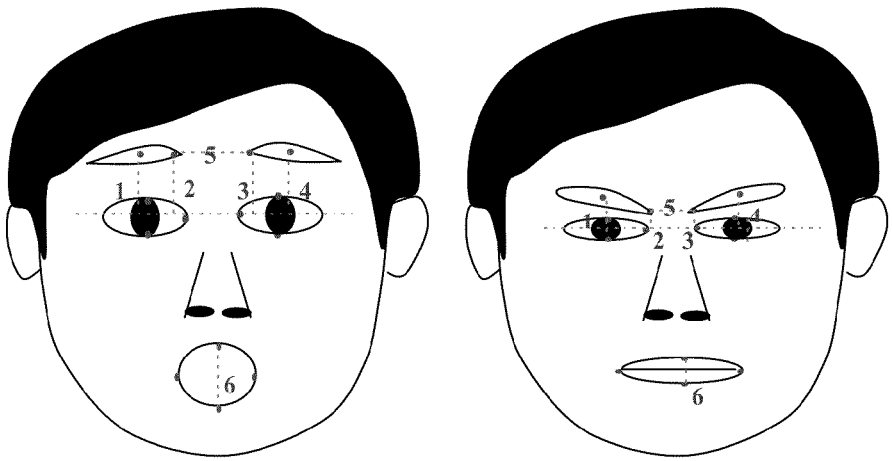

In addition, the facial expressions shown in FIG. 5F~FIG. 5G are evaluated by the six feature values listed in Table 5. It is because that the difference in an angry/sad face and a neutral face is mainly distinguishable by the variations in distance between eyebrows and eyes as well as the distance between upper and lower lips. For instance, when angry, one is likely to bend one's eyebrows; and when surprised, one is likely to raise one's eyebrows. FIG. 5F shows a comparison between a neutral facial expression and a surprise facial expression. FIG. 5G shows a comparison between an angry facial expression and a surprise facial expression.

TABLE 5

Key feature values for facial expressions of FIG. 5F~FIG. 5G

| | |
|---|---|
| 1 | Distance between center points of right eyebrows and |
| 2 | Distance between edges of right eyebrows and eyes |
| 3 | Distance between edges of left eyebrows and eyes |
| 4 | Distance between center points of left eyebrows and left |
| 5 | Distance between upper and lower edges of right eye |
| 6 | Distance between upper and lower lips |

Figure 5H:
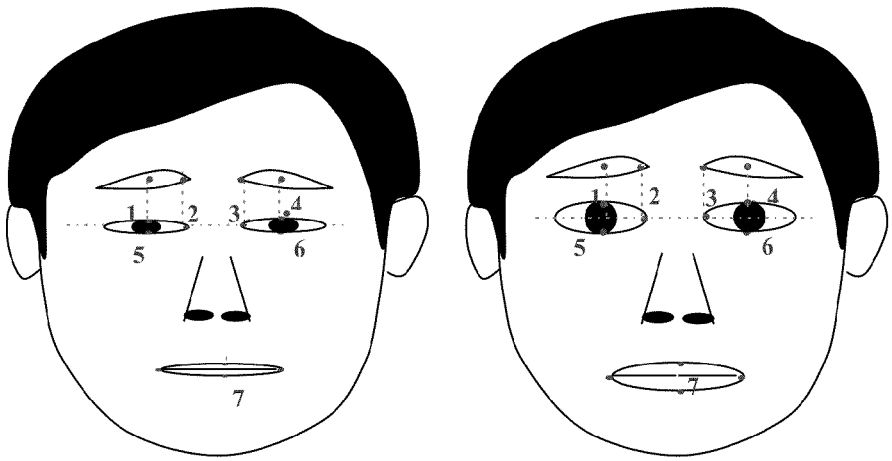
Figure 5I:
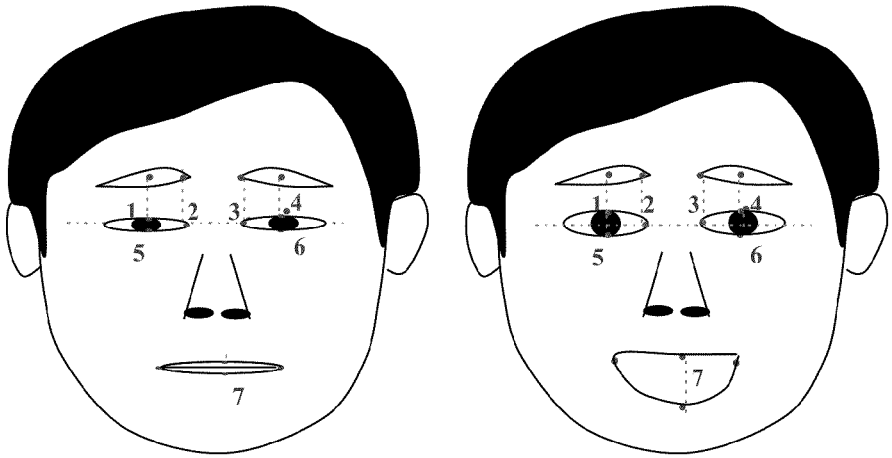

The facial expressions shown in FIG. 5H~FIG. 5I are evaluated by the seven feature values listed in Table 6. It is because that the difference in a sad/happy face and a neutral face is mainly distinguishable by the variations in distance between eyebrows and eyes, the size of eyes as well as the distance between upper and lower lips. For instance, when sad, one is likely to look down, narrow one' eyes and meeting lips tightly. FIG. 5H shows a comparison between a sad facial expression and a neutral facial expression. FIG. 5G shows a comparison between a sad facial expression and a happy facial expression.

TABLE 6

Key feature values for facial expressions of FIG. 5H~FIG. 5I

| | |
|---|---|
| 1 | Distance between center points of right eyebrows and |
| 2 | Distance between edges of right eyebrows and eyes |
| 3 | Distance between edges of left eyebrows and eyes |
| 4 | Distance between center points of left eyebrows and left |
| 5 | Distance between upper and lower edges of right eye |
| 6 | Distance between upper and lower edges of left eye |
| 7 | Distance between right and left eyebrows |

Figure 5J:
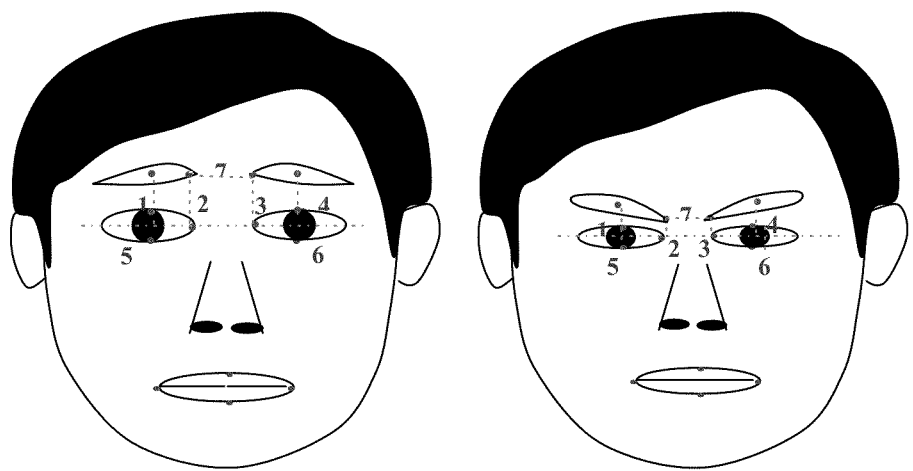

Moreover, the facial expression shown in FIG. 5J is evaluated by the seven feature values listed in Table 7. It is because that the difference in anger and neutral facial expression is mainly distinguishable by the variations in distance between eyebrows and eyes and the size of eyes. For instance, when s angry, one is likely to bend one's eyebrows, which is obvious while comparing with a neutral face. FIG. 5H shows a comparison between a neutral facial expression and an angry facial expression.

TABLE 7

Key feature values for facial expressions of FIG. 5J

| | |
|---|---|
| 1 | Distance between center points of right eyebrows and |
| 2 | Distance between edges of right eyebrows and eyes |
| 3 | Distance between edges of left eyebrows and eyes |
| 4 | Distance between center points of left eyebrows and left |
| 5 | Distance between upper and lower edges of right eye |
| 6 | Distance between upper and lower edges of left eye |
| 7 | Distance between upper and lower lips |

From the aforesaid embodiments, it is noted that by adjusting feature values being using for emotion recognition with respect to actual conditions, both recognition speed and recognition rate can be increased.

After establishing a plurality of vocal training samples and a plurality of image training samples, they are being classified by a support vector machine (SVM) classifier, being a machine learning system that is developed based on Statistical Learning Theory and used for dividing a group into two sub-groups of different characteristics. The SVM classifier is advantageous in that it has solid theoretical basis and well organized architecture that can perform in actual classification. It is noted that a learning process is required in the SVM classifier for obtaining a hyperplane used for dividing the target group into two sub-groups. After the hyperplane is obtained, one can utilize the hyperplane to perform classification process upon unknown data.

Figure 6A:
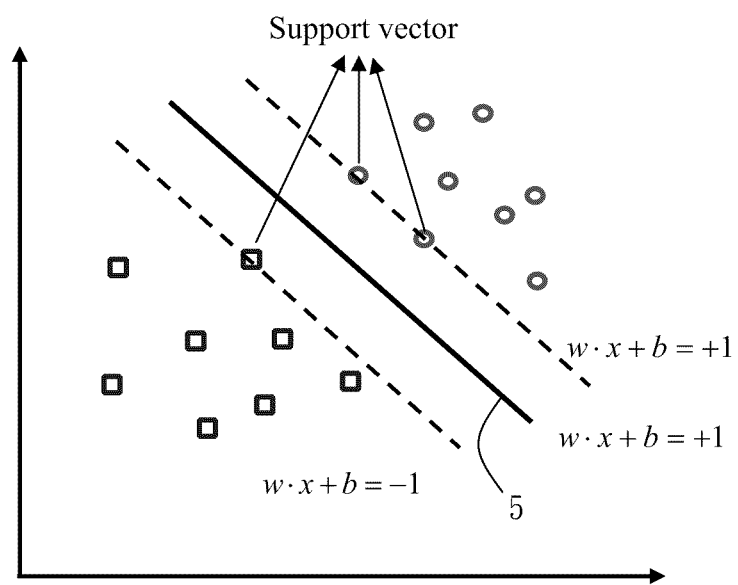
FIG. 6A shows a hyperplane established by SVM.

In FIG. 6A, there are a plurality of training samples, represented as $x_i$, (i=1~1) existed in a space defined by the coordinate system of FIG. 6A, and a hyperplane 5 is defined a linear function, i.e. $w \cdot x + b = 0$, wherein w represents normal vector of the hyperplane 5, which is capable of dividing the plural training samples $x_i$ into two sub-groups, labeled as $y_i = \{+1, -1\}$. Those training samples that is at positions most close to the hyperplane are being defined as support vector and used for plotting the two dotted lines in FIG. 6, which are described as $w \cdot x + b = +1$ and $w \cdot x + b = -1$. While dividing the plural training samples into two sub-groups, it is intended to search a hyperplane that can cause a maximum boundary distance to be derived while satisfying the following two constraints:

$$w \cdot x_i + b \geq +1 \text{ for } y_i = +1 \quad (1)$$

$$w \cdot x_i + b \leq -1 \text{ for } y_i = -1 \quad (2)$$

The two constraints can be combined and represented as following:

$$y_i(w \cdot x_i + b) \geq 0, \forall i \quad (3)$$

It is noted that the distance between support vector and the hyperplane is $$\frac{1}{\|w\|},$$

and there can be more than one hyperplane capable of dividing the plural training samples. For obtaining the hyperplane that can cause a maximum boundary distance to be derived as the boundary distance is $$\frac{2}{\|w\|},$$

it is equivalent to obtaining the minimum of the $$\frac{\|w\|^2}{2}$$

while satisfying the constraint of function (3). For solving the constrained optimization problem based on Karush-Kuhn-Tucker condition, we reformulate the constrained optimization problem into corresponding dual problem, whose Lagrange is represented as following:

$$L(w, b, \alpha) \equiv \frac{1}{2}\|w\|^2 - \sum_{i=1}^{l} \alpha_i[y_i(w \cdot x_i + b) - 1] \quad (4)$$

whereas $\alpha_i$ is the Lagrange Multipliers, $\alpha_i \geq 0$ i=1~1 while satisfying $$\frac{\partial L(w, b, \alpha)}{\partial w} = 0, \text{ obtaining } w = \sum_{i=1}^{i} \alpha_i y_i x_i \quad (5)$$

$$\frac{\partial L(w, b, \alpha)}{\partial b} = 0, \text{ obtaining } \sum_{i=1}^{i} \alpha_i y_i = 0 \quad (6)$$

By substituting functions (5) and (6) into the function (4), one can obtain the following:

$$L(w, b, \alpha) \equiv \sum_{i=1}^{i} \alpha_i - \frac{1}{2}\sum_{i,j=1}^{l} \alpha_i \alpha_j y_i y_j x_i \cdot x_j \quad (7)$$

Thereby, the original problem of obtaining the minimum of L(w,b,a) is transformed into a corresponding dual problem for obtaining the maximum, being constrained by functions (5) (6) and $\alpha_i \geq 0$.

For solving the dual problem, each Lagrange coefficient $\alpha_i$ corresponds to one training samples, and such training sample is referred as the support vector that fall on the boundary for solving the dual problem if $\alpha_i \geq 0$. Thus, by substituting $\alpha_i$ into function (5), the value w can be acquired. Moreover, the Karush-Kuhn-Tucker complementary conditions of Fletcher can be utilized for acquiring the value b:

$$\alpha_i(y_i(w \cdot x_i + b) - a) = 0, \forall i \quad (8)$$

Finally, a classification function can be obtained, which are:

$$f(x) = \text{sgn}\left(\sum_{i=1}^{l} y_i \alpha_i \cdot (x \cdot x_i) + b\right) \quad (9)$$

When f(x)>0, such training data is labeled by "+1"; otherwise, it is labeled by "−1"; so that the group of training samples can be divided into two sub-groups of {+1, −1}.

However, the aforesaid method can only work on those training samples that can be separated and classified by linear function. If the training samples belong to non-separate classes, the aforesaid method can no longer be used for classifying the training samples effectively. Therefore, it is required to add a slack variable, i.e. 0, into the original constraints, by which another effective classification can be obtained, as following:

$$f(x) = \text{sgn}(w \cdot x_i + b) \quad (10)$$

wherein
w represents normal vector of the hyperplane;
$x_i$ is the feature value of a pre-test data;
b represents intercept.

Thereby, when f(x)>0, such training data is labeled by "+1"; otherwise, it is labeled by "−1"; so that the group of training samples can be divided into two sub-groups of {+1, −1}.

Figure 2A:
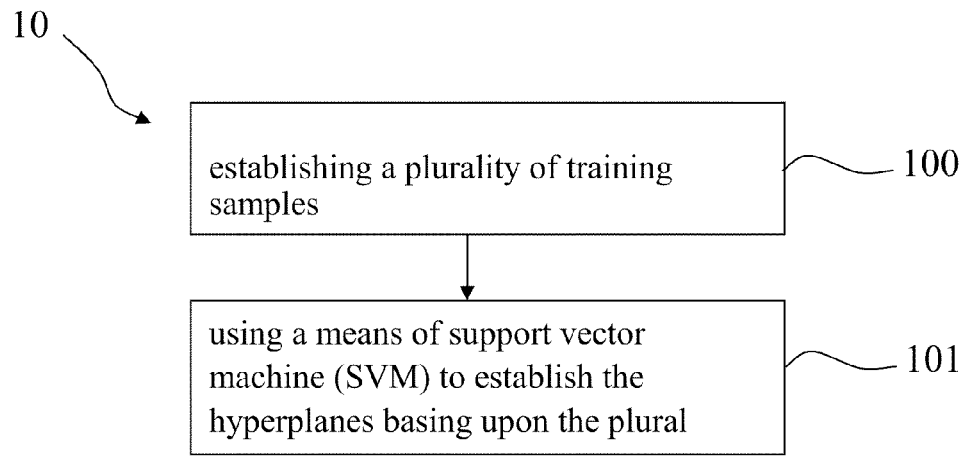
FIG. 2A is a flow chart depicting steps for establishing hyperplanes used in the emotion recognition method of the disclosure.
Figure 6B:
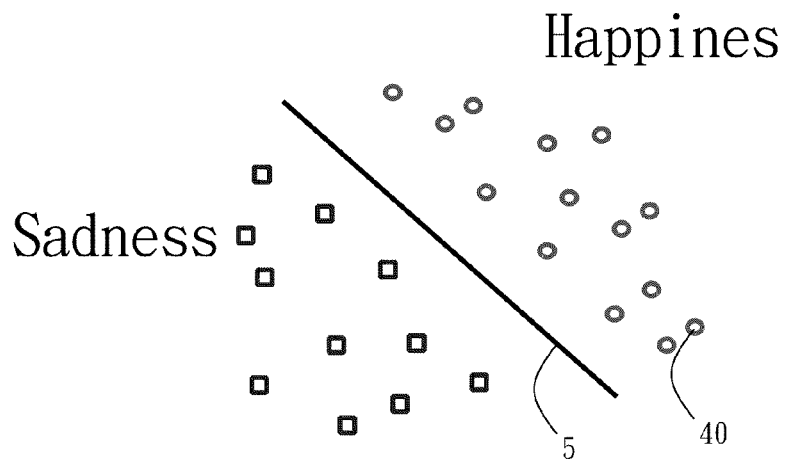
FIG. 6B shows the relationship between a hyperplane and training samples according to an exemplary embodiment of the disclosure.

Back to step 101 shown in FIG. 2A, a means of support vector machine (SVM) is used to establish the hyperplanes for separating different emotions basing upon the plural vocal and image training samples. For instance, the image training sample can be used for establishing a hyperplane for separating sadness from happiness, or for separating neutral from surprise, etc., which is also true for the vocal training samples. Please refer to FIG. 6B, which shows the relationship between a hyperplane and training samples according to an exemplary embodiment of the disclosure. In FIG. 6B, each dot 40 represents an image training sample and the straight line 5 is a hyperplane separating the group into two sub-groups, whereas the hyperplane is established basing upon the aforesaid SVM method and functions. As seen in FIG. 6B, the hyperplane 5 separates the group of training samples into two sub-groups that one sub-group is labeled as happiness while another being labeled as sadness. It is noted that the amount of hyperplane required is dependent on the amount of emotion required to be separated from each other and thus classified.

By the process shown in FIG. 2A, hyperplanes can be established and used for separating different emotions so that the use of hyperplane to define two emotion categories as depicted in step 10 of FIG. 1 is accomplished. Thereafter, the so-established hyperplanes can be used for classifying unknown vocal/image data. Thus, at step 11 of FIG. 1, at least two unknown data, with an audio sensor and an image sensor, to be identified are inputted in correspondence to the at least two hyperplanes while enabling each unknown data to correspond to one emotion category selected from the two emotion categories of the hyperplane corresponding thereto; and then the flow proceeds to step 12. During the processing of the aforesaid step 11, the vocal and image feature acquisition units 20, 21 of the system 2 shown in FIG. 3 are used for respectively fetching image and vocal feature values so as to be used as the aforesaid at least two unknown data to be identified. It is noted that the fetching of unknown data is performed the same as that of training samples, and thus is not described further herein. Moreover, as one can expect, the unknown image data might includes facial image data and gesture image data, or the combination thereof. However, in the exemplary embodiment of the disclosure, only facial image data and vocal data are used, but is only for illustration and not limited thereby.

At step 12, a calculation process is respectively performed upon the two unknown data for assigning each with a weight with a computing unit; and then the flow proceeds to step 13. During the processing of the step 12, the vocal and image feature values acquired from step 11 are used for classifying emotions. It is noted that the classification used in step 12 is the abovementioned SVM method and thus is not described further herein.

Figure 7A:
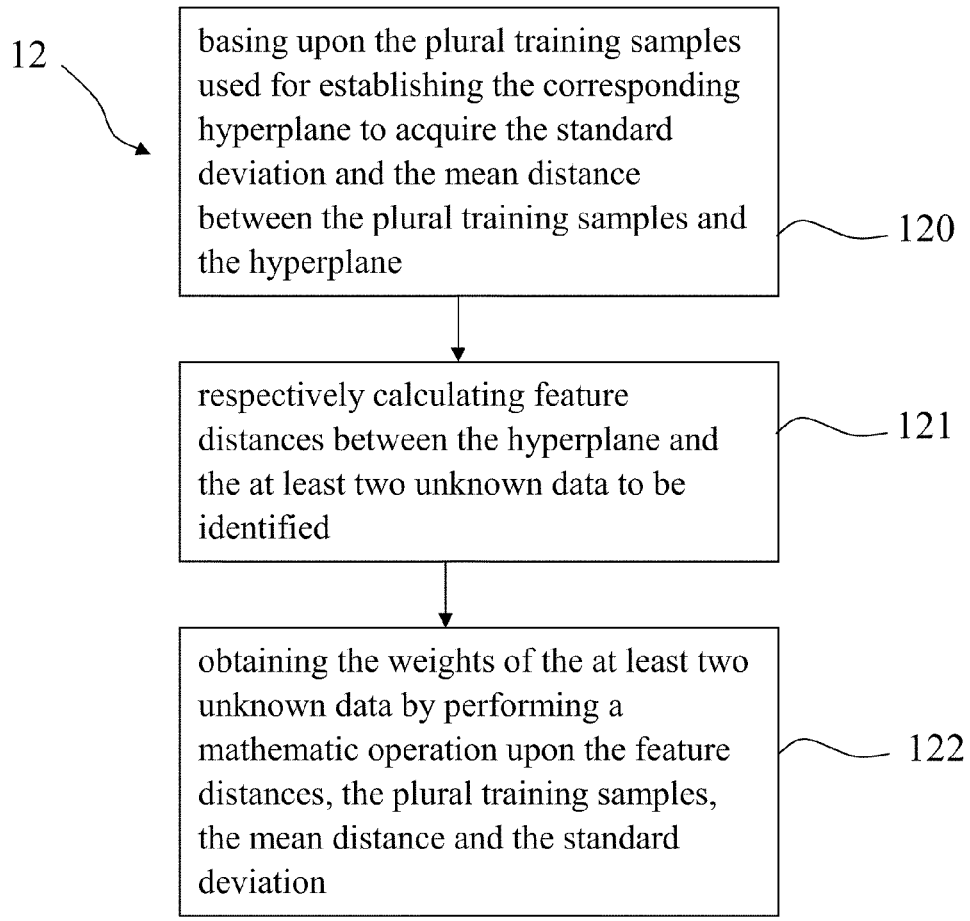
FIG. 7A and FIG. 7B show steps for acquiring weights to be used in the emotion recognition method of the disclosure.
Figure 8A:
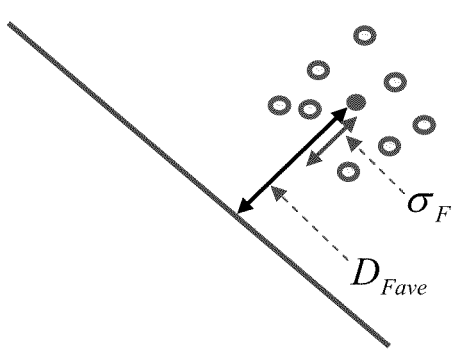
FIG. 8A and FIG. 8B are schematic diagrams showing the standard deviation and means of a facial image training sample and a vocal training sample.
Figure 8B:
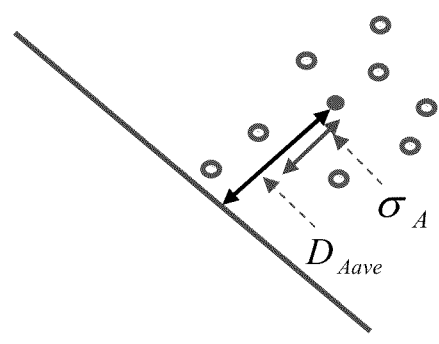

Please refer to FIG. 7A, which shows steps for acquiring weights to be used in the emotion recognition method of the disclosure. The flow starts from step 120. At step 120, basing upon the plural training samples used for establishing the corresponding hyperplane, the standard deviation and the mean distance between the plural training samples and the hyperplane can be acquired, as illustrated in FIG. 8A and FIG. 8B; and then the flow proceeds to step 121. In FIG. 8A and FIG. 8B, $D_{Fave}$ and $D_{Aave}$ represent respectively the mean distances of image and vocal feature values while $\sigma_F$ and $\sigma_A$ represent respectively standard deviations of image and vocal feature values.

In detail, after facial and vocal features are detected and classified by SVM method for obtaining a classification result for training samples, and then the standard deviations and the mean distances of training data are obtained with respect to the hyperplanes, feature distances between the corresponding hyperplanes and the at least two unknown data to be identified can be obtained by the processing of step 121; and then step 122 is proceeded thereafter. An exemplary processing results of step 120 and step 121 are listed in table 8, as following:

TABLE 8

| Parameters of two feature sets | | |
|---|---|---|
| | Facial feature | Vocal feature |
| Training samples | $D_{Fave}$, $\sigma_F$ | $D_{Aave}$, $\sigma_A$ |
| Unknown data | $D_{Fi}$ for i = 1~N | $D_{Ai}$ for i = 1~N |

Figure 7B:
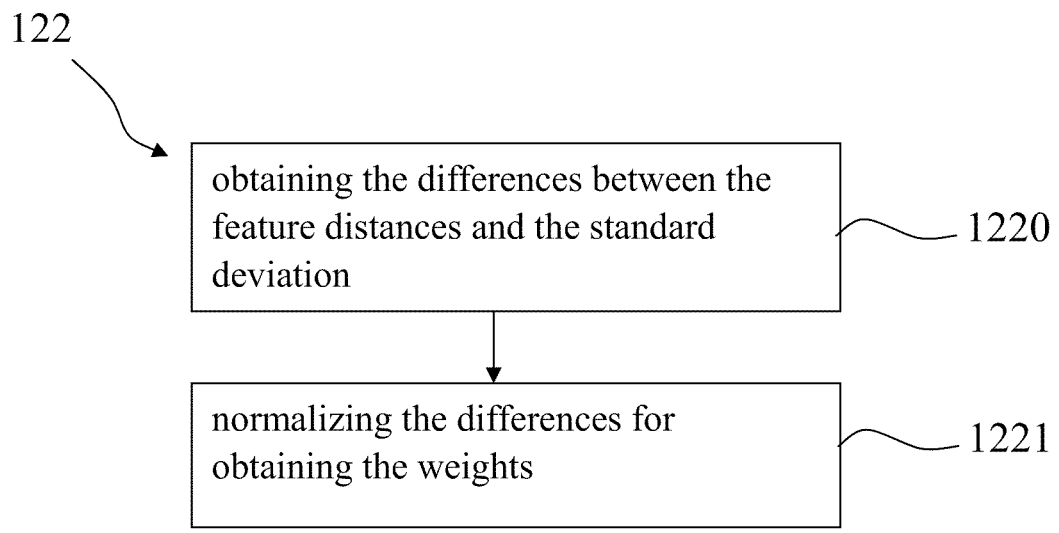

At step 122, the weights of the at least two unknown data are obtained by performing a mathematic operation upon the feature distances, the plural training samples, the mean distance and the standard deviation. The steps for acquiring weights are illustrated in the flow chart shown in FIG. 7B, in which normalized weights of facial image $Z_{Fi}$ and normalized weights of vocal data $Z_{Ai}$ are obtained by the step 1220 and step 1221 following the functions listed below:

$$Z_{Fi} = \frac{D_{Fi} - \sigma_F}{D_{Fave} - \sigma_F}, \text{ for } i = 1 \sim N; \quad (11)$$

$$Z_{Ai} = \frac{D_{Ai} - \sigma_A}{D_{Aave} - \sigma_A}, \text{ for } i = 1 \sim N; \quad (12)$$

Figure 9:
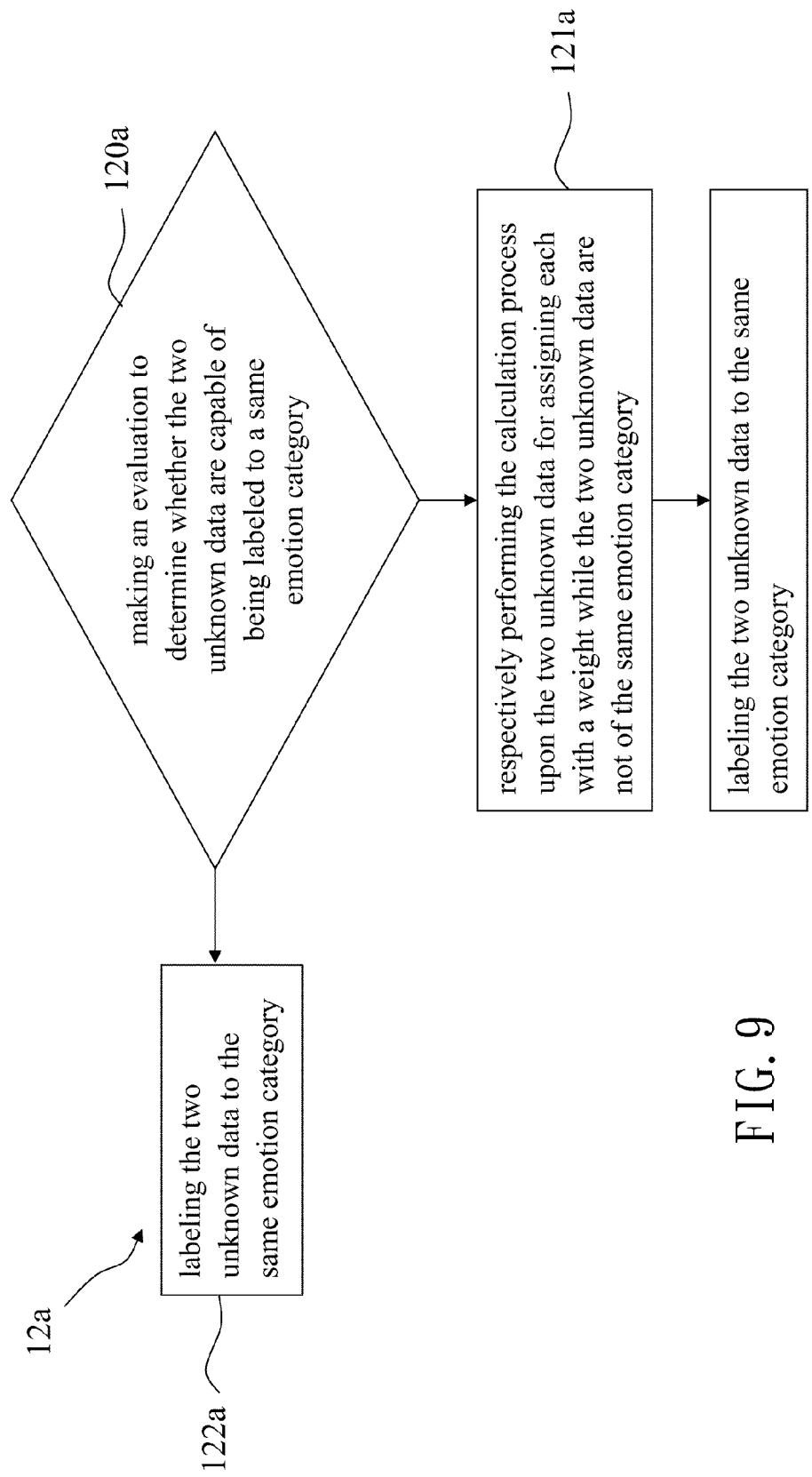
FIG. 9 is a flow chart depicting steps for evaluating whether the two unknown data can be labeled to a same emotion category.

Thereafter, step 13 of FIG. 1 is performed. At step 13, the assigned weight of the two unknown data are compared with each other while using the comparison as base for selecting one emotion category out of those emotion categories as an emotion recognition result with the computing unit. However, before performing the aforesaid step 13, a flow chart 12a shown in FIG. 9 for evaluating whether the two unknown data are capable of being labeled to a same emotion category should be performed first. The flow starts at step 120a. At step 120a, an evaluation is made to determine whether the two unknown data are capable of being labeled to a same emotion category, that is, by the use of the hyperplane of FIG. 1 to determine whether the at least two known data are existed at the same side with respect to the hyperplane; if so, the flow proceeds to step 122a; otherwise, the flow proceeds to step 121a. At step 121a, the calculation process is performed upon the two unknown data for assigning each with a weight, and then proceeds to step 13 of FIG. 1 to achieve an emotion recognition result. It is noted that during the processing of step 13, if $Z_{Fi} > Z_{Ai}$, then the recognition result based upon facial feature values are adopted; otherwise, i.e. $Z_{Ai} > Z_{Fi}$, then the recognition result based upon vocal feature values are adopted.

As the method of the disclosure is capable of adopting facial image data and vocal data simultaneously for classification, it is possible to correct a classification error based upon the facial image data by the use of vocal data, and vice versa, by which the recognition accuracy is increased.

Figure 10A:
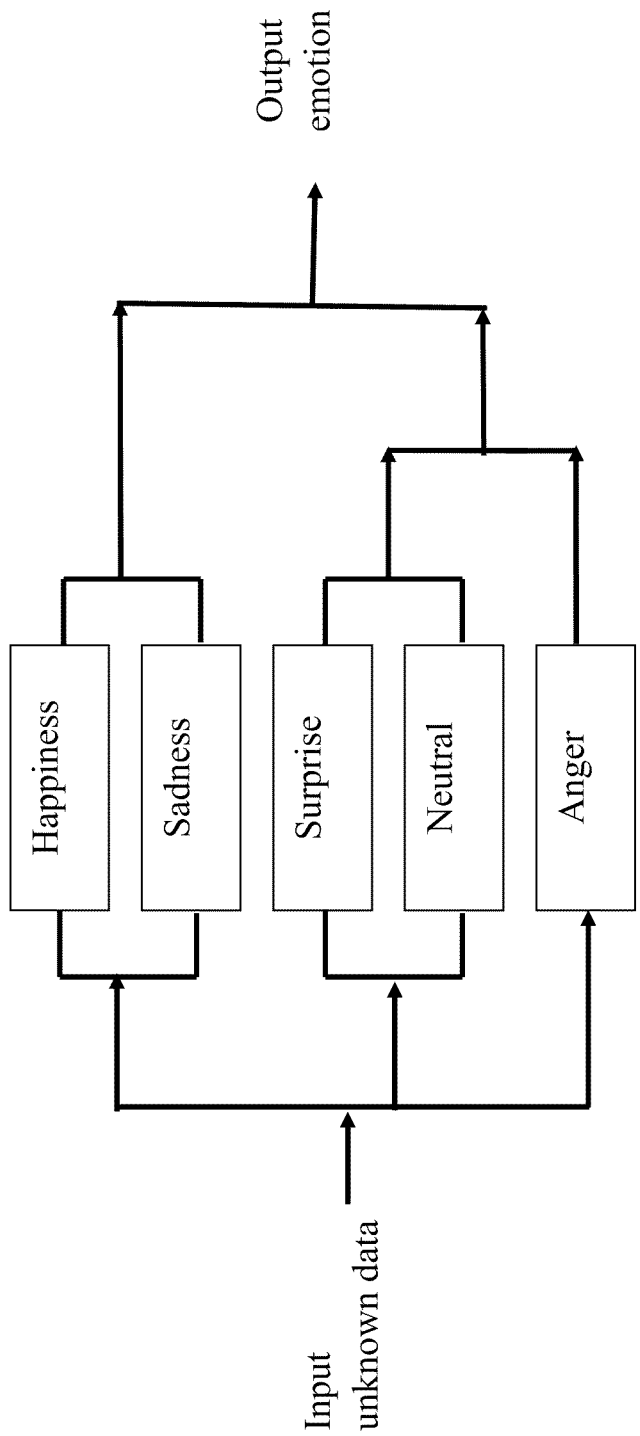
FIG. 10A~FIG. 10D show the successive stages of an emotion recognition according to an exemplary embodiment of the disclosure.
Figure 10B:
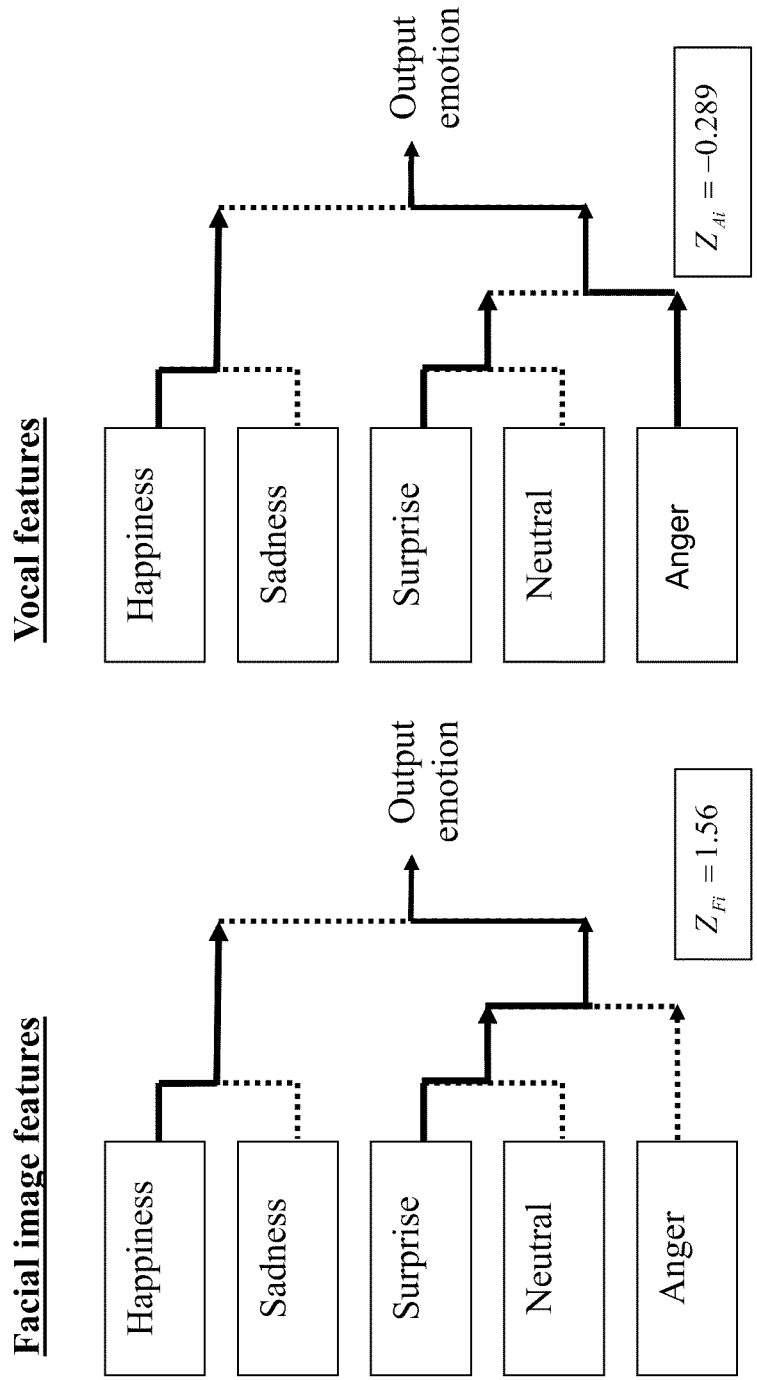
Figure 10C:
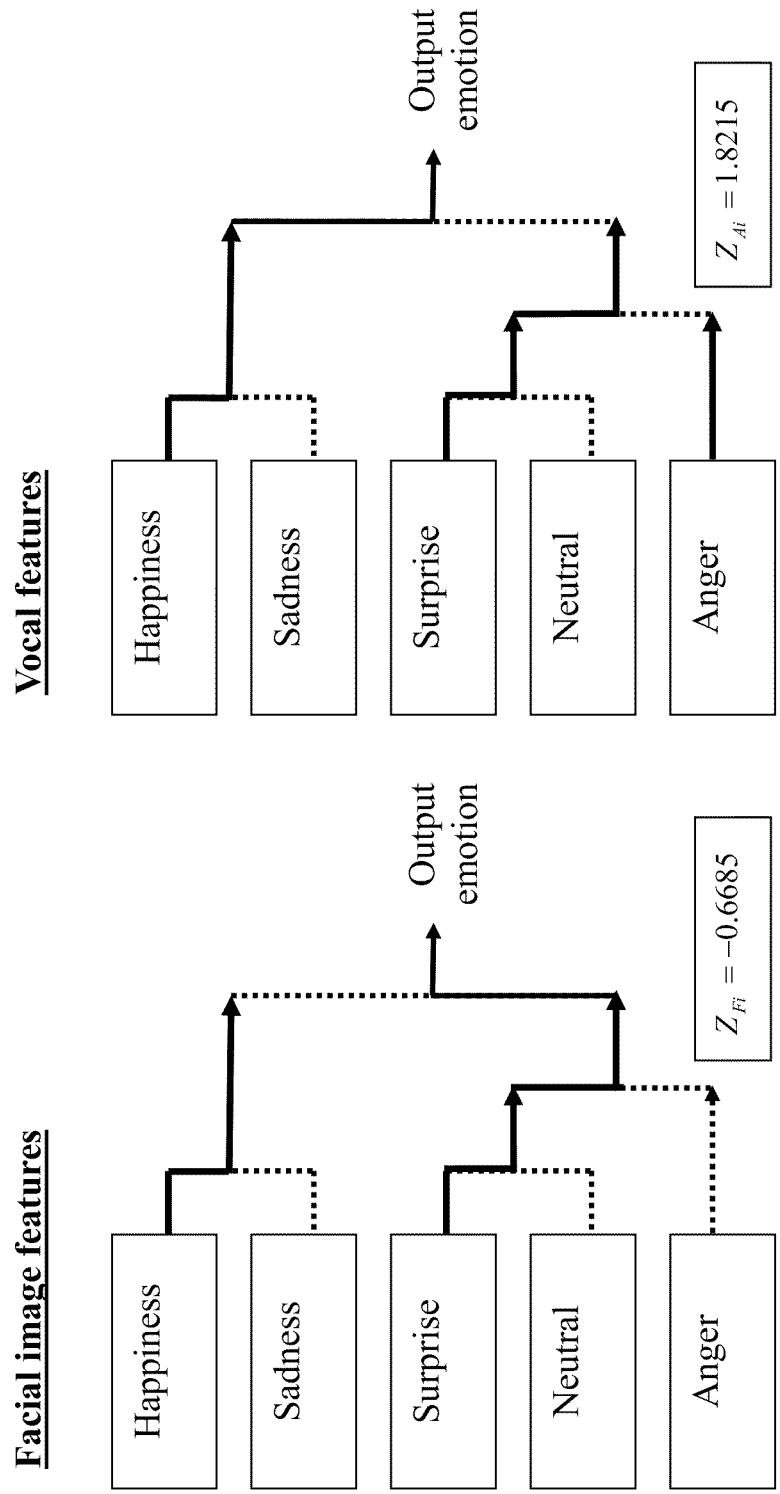

Please refer to FIG. 10A to FIG. 10D, which show the successive stages of an emotion recognition method according to an exemplary embodiment of the disclosure. In this embodiment, five emotions are categorized while being separated by SVM hyperplanes. Therefore, a four-stage classifier needs to be used as shown in FIG. 10A. Each stage determines one emotion from the two and the selected one will go to the next stage until a final motion is classified. When there are facial image data and vocal data being inputted and classified simultaneously and the emotion output based upon the facial image data is surprise while the emotion output based upon the vocal data is anger as shown in FIG. 10B, it is required to compared the $Z_{Fi}$ of facial image data and the $Z_{Ai}$ of vocal data, being calculated and obtained respectively by functions (11) and (12).

Figure 10D:
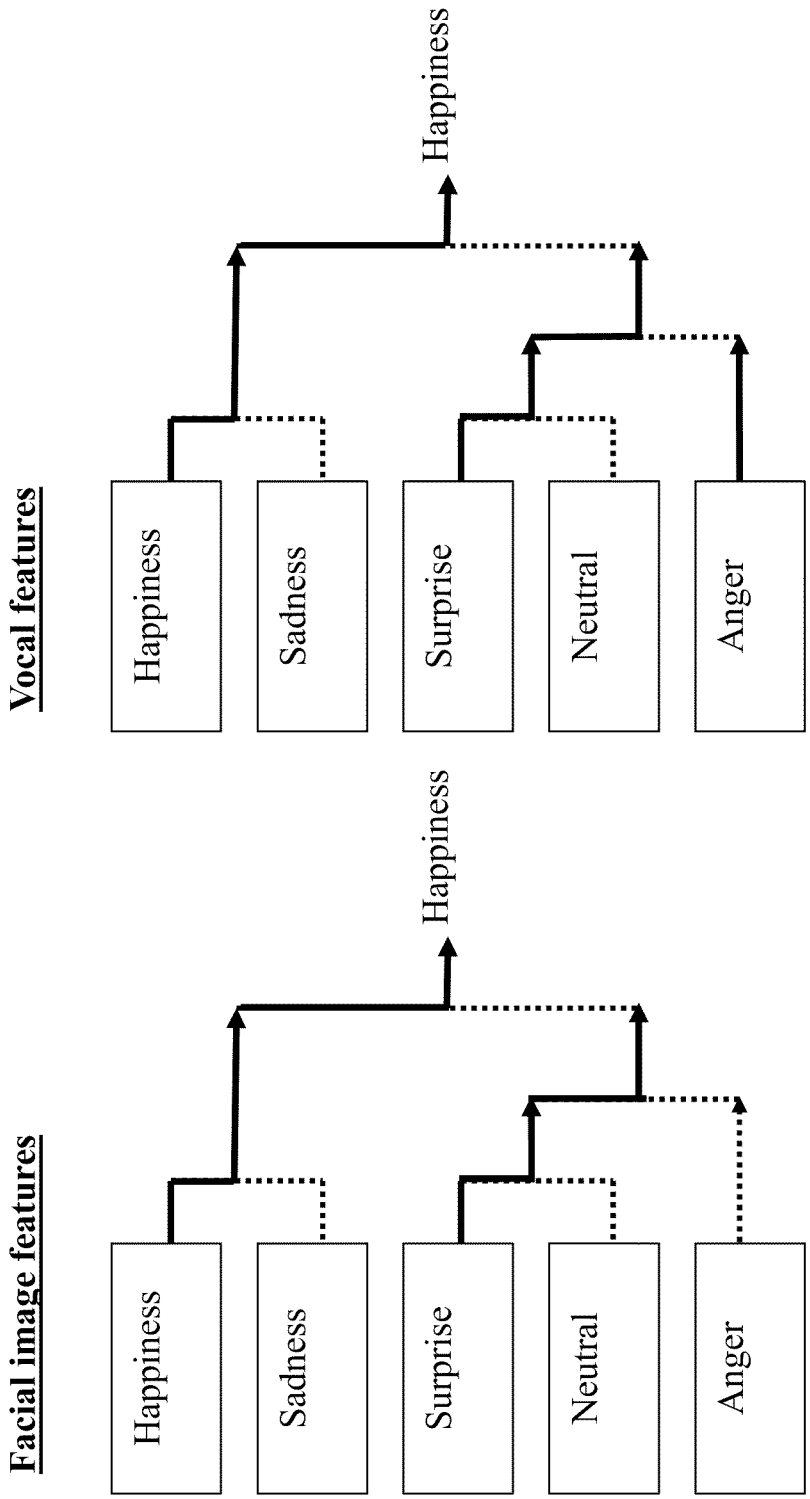

In FIG. 10B, $Z_{Fi}$ is 1.56 and $Z_{Ai}$ is −0.289 that $Z_{Fi} > Z_{Ai}$, indicating that the reliability of recognition based upon facial image data is higher than the vocal data. Therefore, the emotion output based upon the facial image data is adopted and thus the emotion output based upon the vocal data is changed from anger to surprise. On the other hand, if the emotion output based upon the facial image data is surprise while the emotion output based upon the vocal data is happiness as shown in FIGS. 10 10B, and $Z_{Fi}$ is −0.6685 and $Z_{Ai}$ is 1.8215 that $Z_{Ai} > Z_{Fi}$, the emotion output based upon the vocal data is adopted. Moreover, if the classification is as shown in FIG. 10D that the emotion outputs of the image and vocal data are the same, no comparison is required and the emotion output is happiness as indicated in FIG. 10D.

Although SVM hyperplanes can be established by the use of the pre-established training samples, the classification based on the hyperplane could sometimes be mistaken under certain circumstances, such as the amount of training samples is not sufficient, resulting the emotion output is significantly different from that appeared in the facial image or vocal data. Therefore, it is required to have a SVM classifier capable of being updated for adapting the same to the abovementioned misclassification.

Conventionally, when there are new data to be adopted for training a classifier, in order to maintain the recognition capability of the classifier with respect to those original data, some representative original data are selected from the original data and added with the new data to be used together for training the classifier, thereby, the classifier is updated while maintaining its original recognition ability with respect to those original data. However, for the SVM classifier, the speed for training the same is dependent upon the amount of training samples, that is, the larger the amount of training samples is, the long the training period will be. As the aforesaid method for training classifier is disadvantageous in requiring long training period, only the representative original data along with the new data are used fro updating classifier. Nevertheless, it is still not able to train a classifier in a rapid and instant manner.

Figure 11:
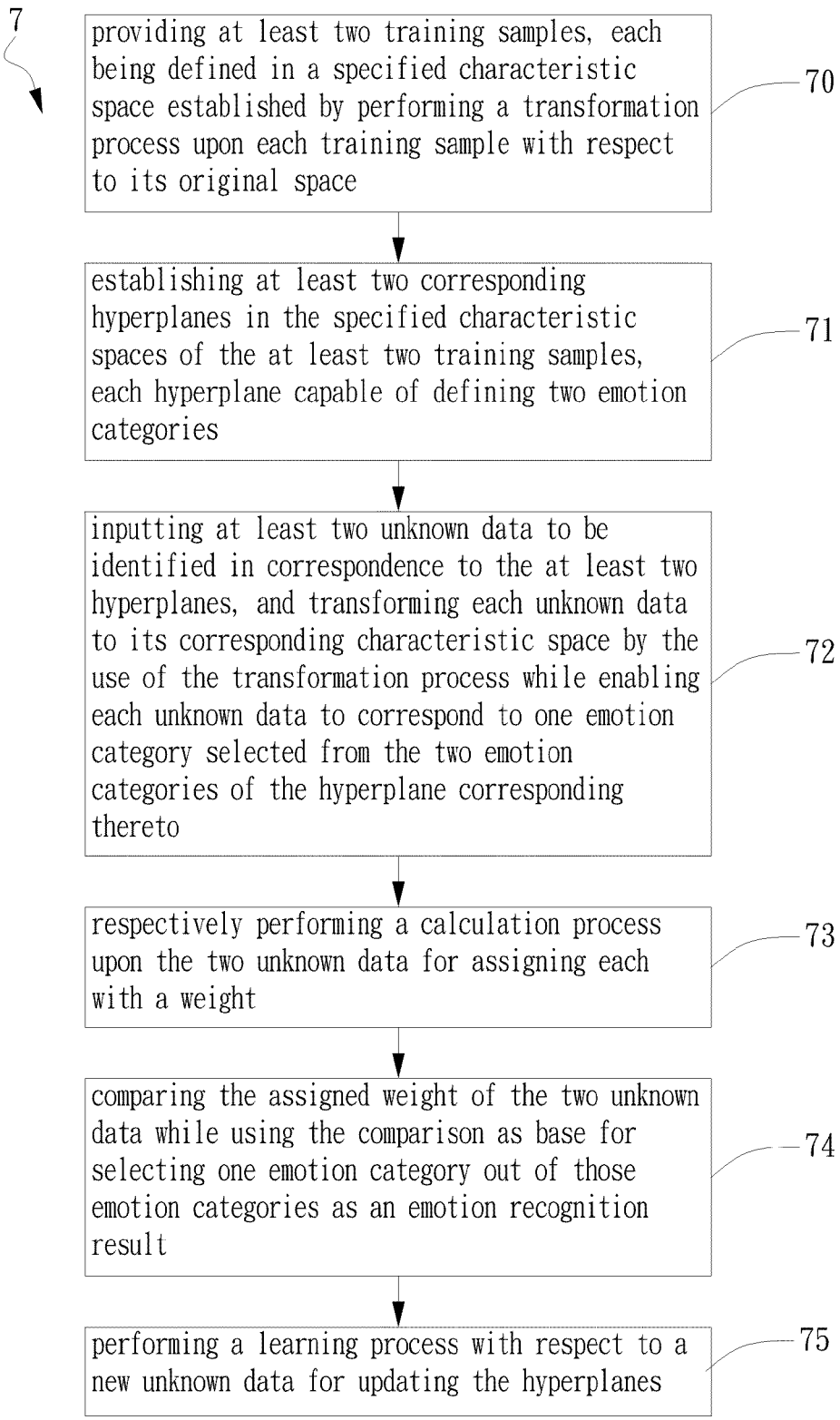
FIG. 11 is a flow chart depicting steps of an emotion recognition method according to a second embodiment of the disclosure.

Please refer to FIG. 11, which is a flow chart depicting steps of an emotion recognition method according to a second embodiment of the disclosure. The emotion recognition method 7 starts from step 70. At step 70, at least two types of training samples are provided, each being defined in a specified characteristic space established by performing a transformation process upon each training sample with respect to its original space; and then the flow proceeds to step 71. It is noted that there is a process, similar to that comprised in step 10 of FIG. 1, to be performed during the processing of step 70. That is, first, five types of training samples corresponding to anger, happiness, sadness, neutral, and surprise emotions are generated and used for generating hyperplanes, whereas each training sample is a feature set including twelve feature values, each being defined with respect to the relative positioning of eyebrows, eyes and lips. However, the difference between the step 10 of FIG. 1 and the step 70 of FIG. 11 is that: the training samples of step 70 are to be transformed by a specific transformation function from its original characteristic space into another characteristic space. In an exemplary embodiment of the disclosure, the transformation function is the Gaussian kernel function.

Figure 12:
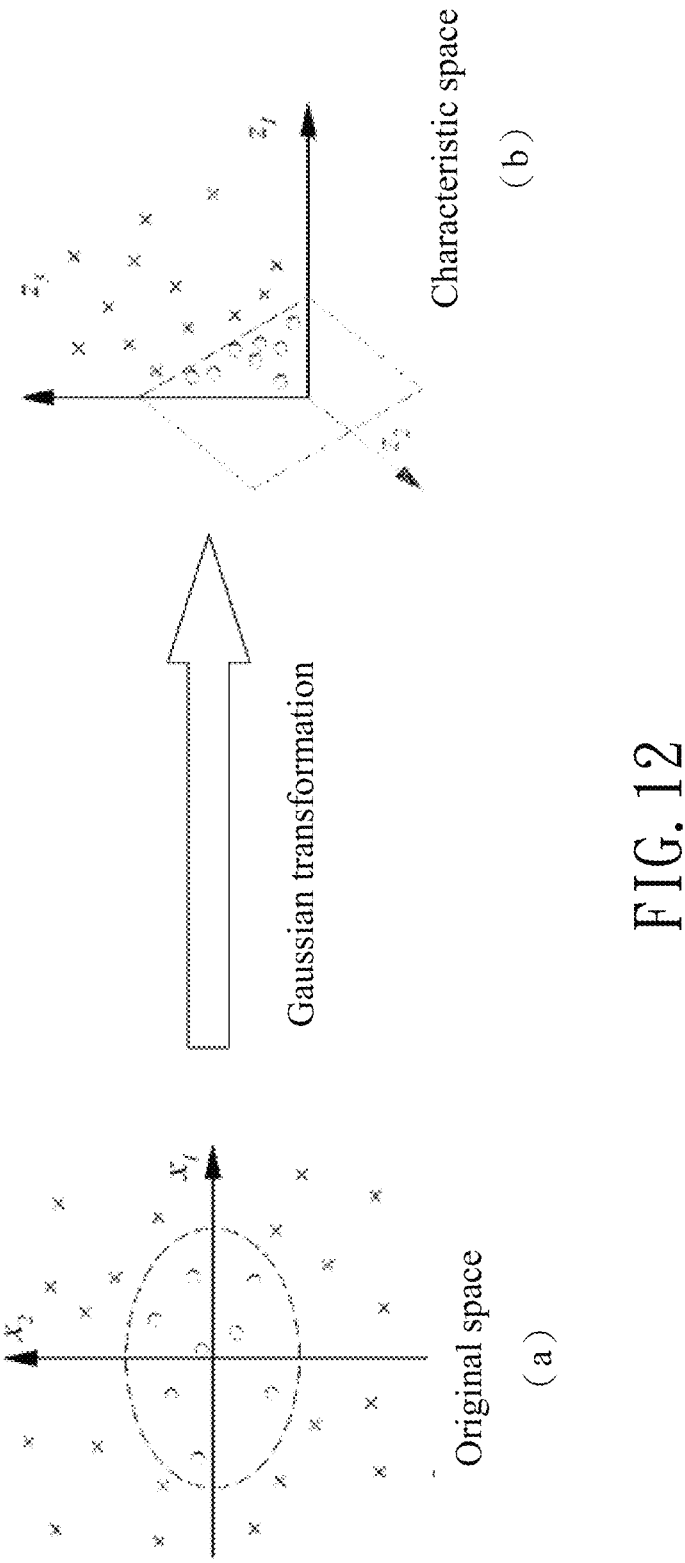
FIG. 12 is a schematic diagram illustrating the transforming of an original characteristic space into another characteristic space.

The spirit of space transformation is to transform training sample form its original characteristic space to another characteristic space for facilitating the transformed training sample to be classified, as shown in FIG. 12. For instance, assuming the training samples are distributed in its original space in a manner as shown in FIG. 12(a), it is difficult to find an ideal segregation to divide the training samples into different classes. However, if a kernel transformation function is existed for transforming the training samples to another characteristic space where they are distributed as those shown in FIG. 12(b), it appears that they are much easier to be classified.

Basing on the aforesaid concept, the training samples of the disclosure are transformed by a Gaussian kernel function, listed as following:

$$K(x_1, x_2) \exp\left(\frac{-\|x_1 - x_2\|^2}{c}\right) \quad (13)$$

wherein,
$x_1$ and $x_2$ respectively represents any two training samples of the plural training samples;
c is a kernel parameter, that can be adjusted with respect to the characteristics of the training samples.

Thus, by the aforesaid Gaussian kernel transformation, the data can be transformed from their original space into another characteristic space where they are distributed in a manner that they can be easily classified. For facilitating the space transformation, the matrix of the kernel function is diagonalized so as to obtain a transformation matrix between the original space and the kernel space, by which any new data can be transform rapidly.

After the new characteristic space is established, the step 71. At step 71, by the use of the aforesaid SVM method, a classification function can be obtained, and then the flow proceeds to step 72. The classification function is listed as following:

$$f(x) = \text{sgn}(w \cdot x_i + b) \quad (14)$$

wherein w represents normal vector of the hyperplane; $x_i$ is the feature value of a pre-test data; b represents intercept.

Thereby, when f(x)>0, such training data is labeled by "+1"; otherwise, it is labeled by "−1"; so that the group of training samples can be divided into two sub-groups of {+1, −1}. It is noted that the hyperplanes are similar to those described above and thus are not further detailed hereinafter.

At step 72, at least two unknown data to be identified in correspondence to the at least two hyperplanes are fetched by a means similar to that shown in FIG. 3, and are transformed into another characteristic space by the use of the transformation process while enabling each unknown data to correspond to one emotion category selected from the two emotion categories of the hyperplane corresponding thereto; and then the flow proceeds to step 73. The processing of step 72 is similar to that of step 11 shown in FIG. 1, the only difference is that the unknown data used in step 72 should first be transformed by the aforesaid space transformation. It is noted that as the processing of step 73 as well as step 74 are the same as those of step 12 and 13 shown in FIG. 1, and thus are not described further herein.

Figure 13:
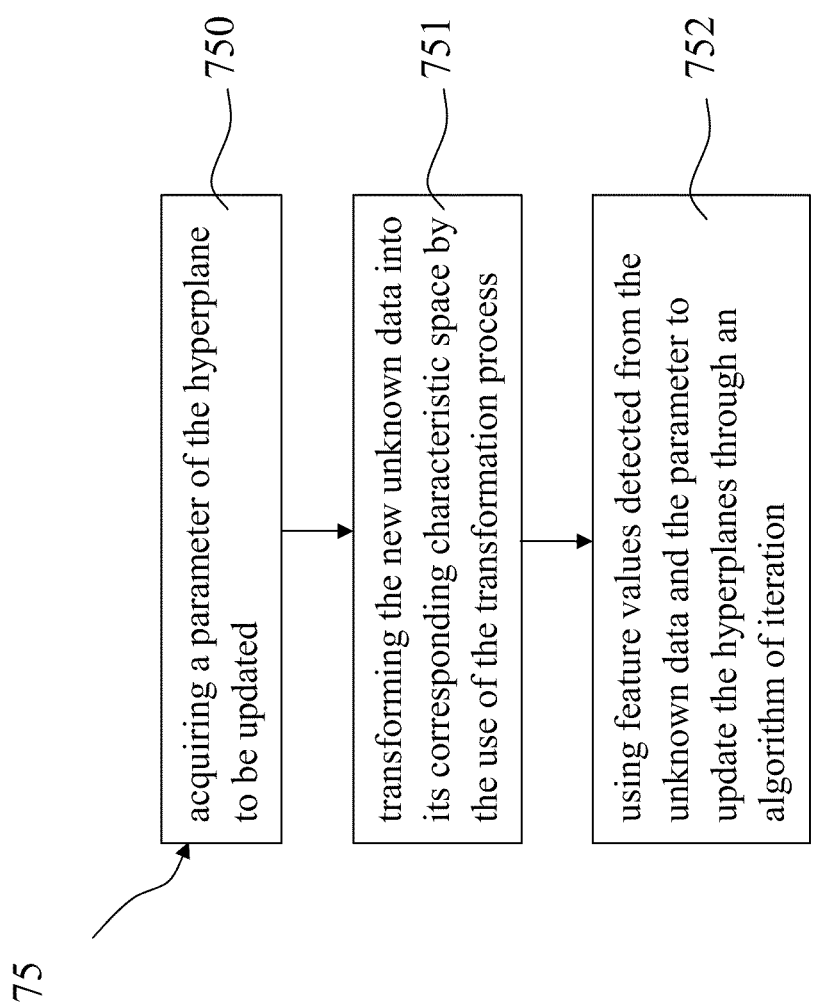
FIG. 13 is a flow chart depicting steps of a learning process used in the emotion recognition method of the disclosure.

In an exemplary embodiment of FIG. 11, the emotion recognition method further comprise a step 75, which is a learning process, being performed with respect to a new unknown data for updating the hyperplanes. The process performed in the learning step is a support vector pursuit learning, that is, while a new data is used for updating the classifier, the feature points of the new data is first being transformed by the space transformation function into the new characteristic space, in which feature values are obtained from the transformed feature points. Please refer to FIG. 13, which is a flow chart depicting steps of a learning process used in the emotion recognition method of the disclosure. The flow starts from step 750. At step 750, the coefficient referred as w of the original classifier is calculated by the use of function (14) and thus obtained, and then the flow proceeds to step 751. At step 751, the new unknown data to be learned is transformed by the specific space transformation function into the specific characteristic space, and then the flow proceeds to step 752. At step 752, the hyperplanes can be updated through an algorithm of iteration, that is, the updated coefficient w is obtained as following:

$$W^k = W^{k-1} + \sum_{i=1}^{m} \alpha_i^k y_i^k X_i^k \quad (15)$$

wherein $W_k$ is a weight of a hyperplane after kth learning; m is the number of data to be learned; $X^k$ is the feature value of the data to be learned; $y_k \in \{+1, -1\}$, represents the class of the data to be learned; $\alpha^k$ is the Lagrange Multiplier.

By the aforesaid learning process, the updated SVM classifier is able to identify new unknown data so that the updated emotion recognition method is equipped with a learning ability for training the same in a rapid manner so as to recognize new emotions.

Figure 14A:
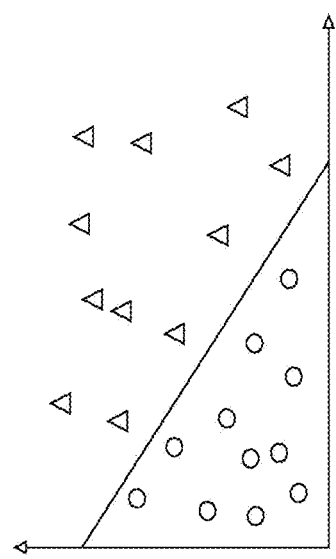
FIG. 14A and FIG. 14B show two similar SVM classifiers trained respectively with all samples and critical sets.
Figure 14B:
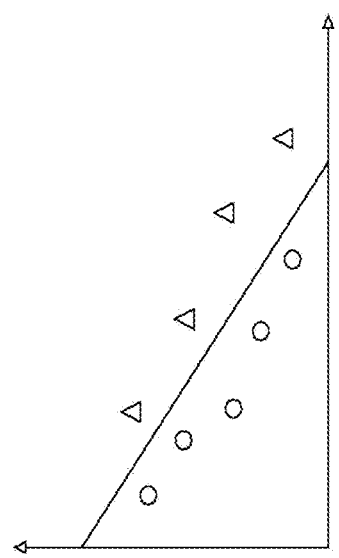

In the process of learning, in order to expedite on-line real-time retraining, the present disclosure also disclosed a critical sets method to maintain a certain number of learning sets after the system learned new features, thus the learning sets will not get bigger and bigger. In general, the more the samples close to the SVM hyperplane, the more the samples affect the hyperplane and such concept is illustrated in FIG. 14. In FIG. 14A, the hyperplane is built by all of the training data in the database, however, in FIG. 14B, only a certain number of training data in the database is used to build the hyperplane. As can be seen, the training data that most close to the hyperplane extremely change the hyperplane. The critical set is defined by the following formula.

$$\text{CSs: } X_i = \arg\min |w \cdot X_i + b| \quad (16)$$

Wherein, the size of critical sets is determined empirically. There is a trade-off between training time and the size of critical sets. Thus, we can adjust the size of critical sets to make a balance between learning time and non-forgetting learning.

As the improved training performed on the support vector pursuit learning of step 75 use only new data that no old original data is required, the time consumed for training old data as that required in conventional update method is waived so that the updating of hyperplane for SVM classifier can be performed almost instantaneously while still maintaining its original recognition ability with respect to those original data.

Figure 15:
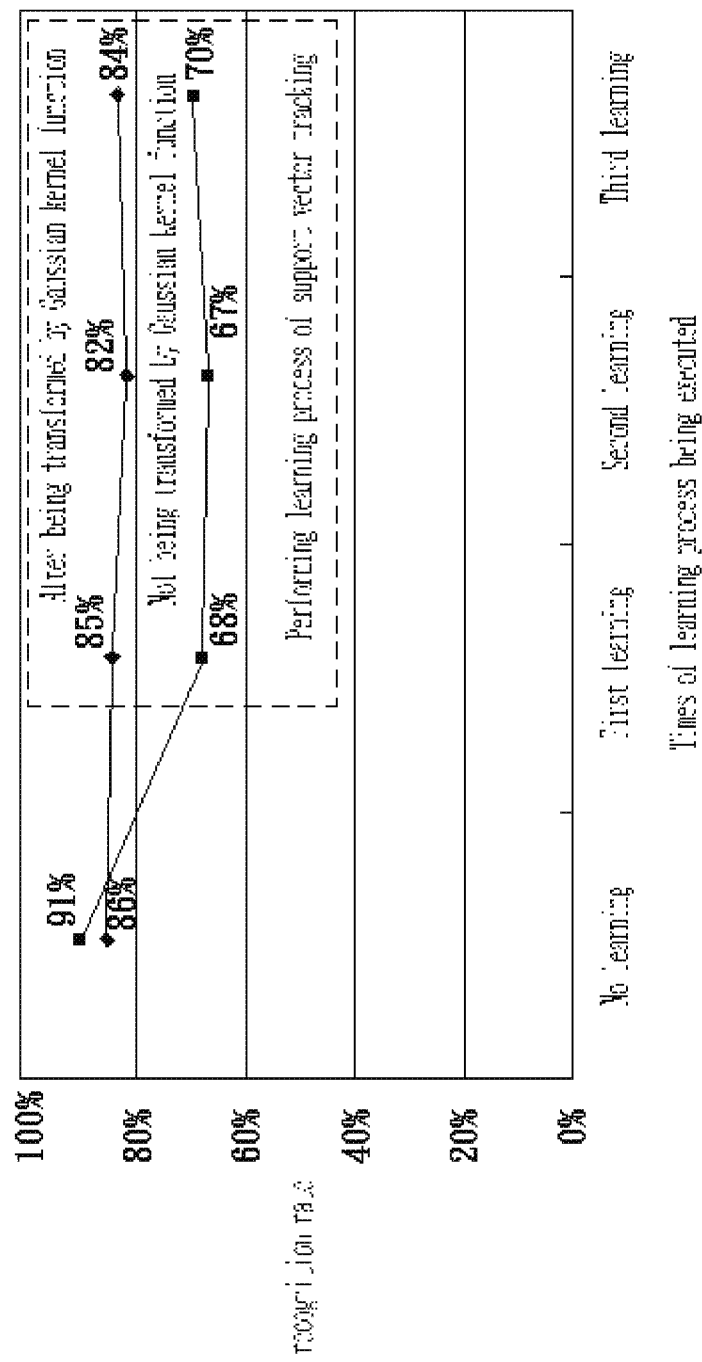
FIG. 15 is a diagram showing recognition rates of a learning process, whereas one profile indicating those from Gaussian-kernel-transformed data and another indicating those not being Gaussian-kernel-transformed.

Please refer to FIG. 15, is a diagram showing recognition rates of a learning process, whereas one profile indicating those from Gaussian-kernel-transformed data and another indicating those not being Gaussian-kernel-transformed. As shown in FIG. 15, after three Gaussian-transformed learning, the recognition rates with respect to original data are 85%, 82% and 84%, which are all higher than those without being transformed by Gaussian kernel function, i.e. 68%, 67% and 70%. Moreover, the recognition rates with respect to original data are much more stable.

Figure 16:
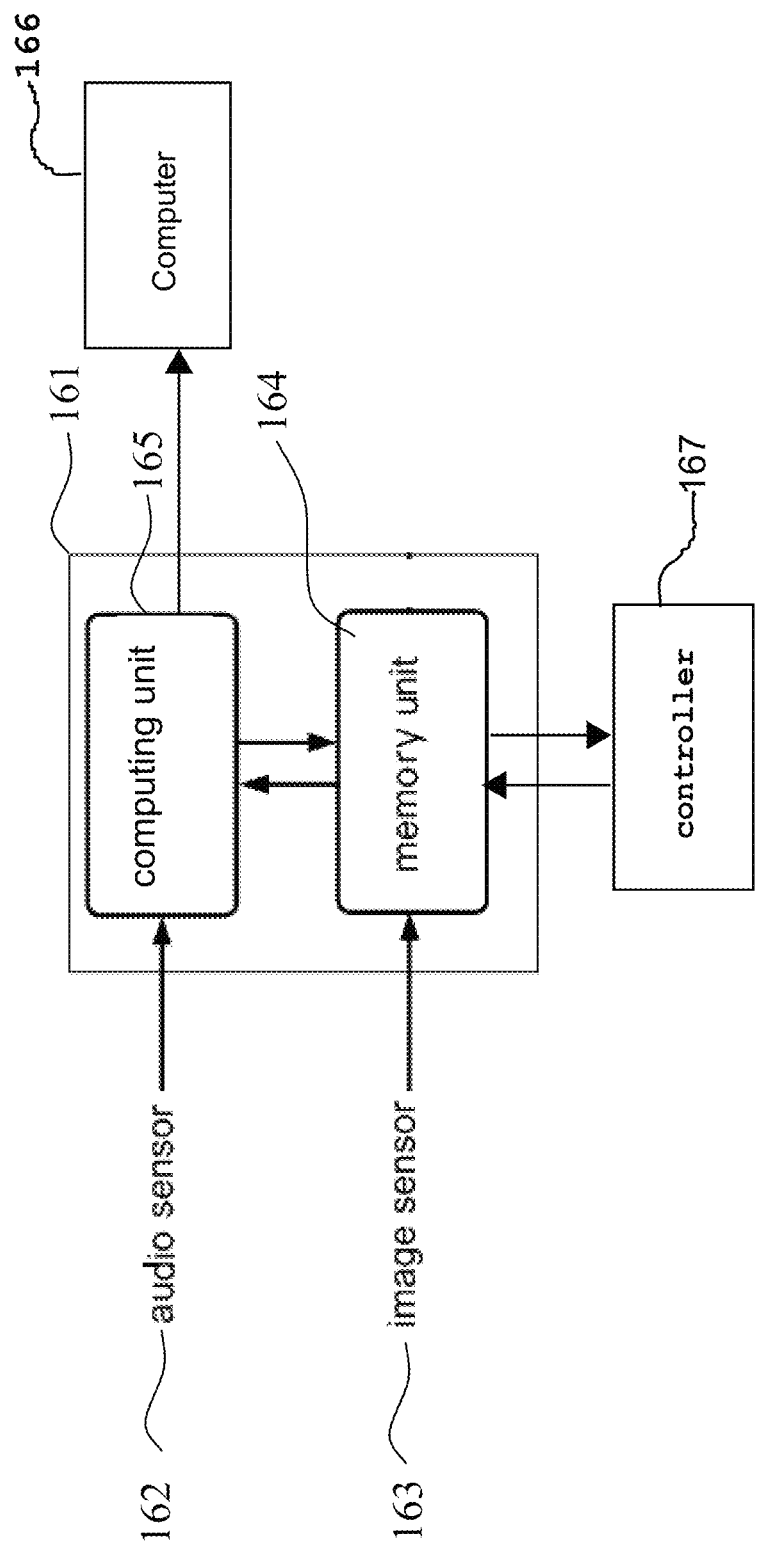
FIG. 16 shows the hardware architecture for realizing the emotion recognition method of the disclosure.

The image-vocal based emotion recognition method of the present disclosure has been successfully implemented in an embedded system and integrated with a robot for intelligent interaction effect. Please refer to FIG. 16, which shows the structure of the real time image-audio embedded processing system 161 by employing the method of the present disclosure. As shown in FIG. 16, the system comprises an audio sensor 162, an image sensor 163, a memory unit 164, a computing unit 165 and a computer 166. In one embodiment of the present disclosure, the audio sensor 162 can be a microphone, the image sensor 163 can be a CMOS image sensor, the memory unit 164 can be an image frame buffer and the computing unit 165 can be a TMS320C6416DSK.

As to audio signal processing, vocal data is collected by the microphone and further read by the TMS320C6416DSK. As to video signal processing, image data captured by the CMOS image sensor is written into frame buffer, and is read by the TMS320C6416DSK later. The method of the emotion recognition of the present disclosure applies when the TMS320C6416DSK reads the vocal data and the image data, and the result is output to a computer 166 via an interface, like RS232. In another embodiment, the system can further comprise a controller 167, such as a FPGA module, for controlling the input and output data of memory unit and for invoking TMS320C6416DSK to read into the image data. Another embodiment is illustrating that a plurality of training data can be built up in a storage unit which is embedded in the TMS320C6416DSK. Based on the plurality of training data in the storage unit, the TMS320C6416DSK execute the step of creating classifier of the present disclosure to build another SVM classifier.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims. For instance, although the learning process is provide in the second embodiment, the aforesaid learning process can be added to the flow chart described in the first embodiment of the disclosure, in which the learning process can be performed without the Gaussian space transformation, but only use the iteration of function (15). Moreover, also in the first embodiment, the original data can be Gaussian-transformed only when the learning process is required, that is, the SVM classifier requires to be updated by new data, and thereafter, the learning process is performed following the step 75 of the second embodiment.

While the preferred embodiment of the disclosure has been set forth for the purpose of disclosure, modifications of the disclosed embodiment of the disclosure as well as other embodiments thereof may occur to those skilled in the art. Accordingly, the appended claims are intended to cover all embodiments which do not depart from the spirit and scope of the disclosure.

What is claimed is:

1. A method used for emotion recognition comprising the steps of:
   (a) establishing hyperplanes, further comprising the steps of:
   (a1) establishing a plurality of training samples; and
   (a2) using a means of support vector machine (SVM) to establish the hyperplanes basing upon the plurality of training samples
   (b) inputting at least two unknown data to be identified while enabling each unknown data to correspond to one of the hyperplanes whereas there are two emotion category being defined in the one of the hyperplanes, and each unknown data being a data selected from an image data and a vocal data;
   (c) respectively performing a calculation process, using a computer, upon the at least two unknown data for assigning each with a weight, the calculation process further comprising the steps of:
   (c1) basing upon the plurality of training samples used for establishing the one of the hyperplanes to acquire a standard deviation and a mean distance between the plurality of training samples and the one of the hyperplanes;
   (c2) respectively calculating feature distances between the one of the hyperplanes and the at least two unknown data to be identified; and
   (c3) obtaining the weights of the at least two unknown data by performing a mathematic operation upon the feature distances, the plurality of training samples, the mean distance and the standard deviation, the mathematic operation further comprising the steps of:
   obtaining differences between the feature distances and the standard deviation; and
   normalizing the differences for obtaining the weights, wherein weights of facial image $Z_{Fi}$ and weights of vocal data $Z_{Ai}$ are obtained wherein $$Z_{Fi} = \frac{D_{Fi} - \sigma_F}{D_{Fave} - \sigma_F}, \text{ for } i = 1 \sim N,$$
   and
   $$Z_{Ai} = \frac{D_{Ai} - \sigma_A}{D_{Aave} - \sigma_A}, \text{ for } i = 1 \sim N;$$

Wherein the $D_{Fave}$ and the $D_{Aave}$ represent average distances between the plurality of training samples and the one of the hyperplanes of facial and speech training data respectively, the $\sigma_F$ and the $\sigma_A$ represent standard deviations of facial and speech training data respectively, the $D_{Fi}$ and the $D_{Ai}$ represent distances between the facial and speech test samples and the corresponding one of the hyperplanes respectively; and
   (d) comparing the assigned weight of the two unknown data while using the comparison as base for selecting one emotion category out of a plurality of emotion categories as an emotion recognition result.

2. The method of claim 1, wherein each of the emotion categories is an emotion selected from a group consisting of happiness, sadness, surprise, neutral and anger.

3. The method of claim 1, wherein the establishing of the plurality of training samples further comprises the steps of:
   (a11) selecting one emotion category out of the two emotion categories;
   (a12) acquiring a plurality of feature values according to the selected emotion category so as to form one of the plurality of training samples;
   (a13) selecting another emotion category;
   (a14) acquiring a plurality of feature values according to the newly selected emotion category so as to form another one of the plurality of training samples; and (a15) repeating steps (a13) to (a14) and thus forming the plurality of training samples.

4. The method of claim 1, wherein the image data is an image selected from the group consisting of a facial image and a gesture image.

5. The method of claim 1, wherein the image data is comprised of a plurality of feature values, each being defined as a distance between two specific features detected in the image data.

6. The method of claim 1, wherein the vocal data is comprised of a plurality feature values, each being defined as a combination of pitch and energy.

7. The method of claim 1, wherein the acquiring of weights of step (c) further comprises the steps of:
(c1) basing on the hyperplanes corresponding to the two unknown data to determine whether the two unknown data are capable of being labeled to a same emotion category; and
(c2) respectively performing the calculation process upon the two unknown data for assigning each with a weight while the two unknown data are not of the same emotion category.

8. The method of claim 1, further comprises a step of: (e) performing a learning process with respect to a new unknown data for updating the hyperplanes, and the step (e) further comprises the steps of:
(e1) acquiring a parameter of the hyperplane to be updated; and
(e2) using feature values detected from the unknown data and the parameter to update the hyperplanes through an algorithm of iteration.

9. The method of claim 1, further comprising the steps of:
(a') providing at least two of the plurality of training samples, each being defined in a specified characteristic space established by performing a transformation process upon each training sample with respect to its original space;
(b') establishing at least two of the hyperplanes in the specified characteristic spaces of the at least two of the plurality of training samples, each of the at least two of the hyperplanes capable of defining two emotion categories;
(c') inputting at least two unknown data to be identified in correspondence to the at least two of the hyperplanes, and transforming each unknown data to its corresponding characteristic space by the use of the transformation process while enabling each unknown data to correspond to one emotion category selected from the two emotion categories of the hyperplane corresponding thereto, and each unknown data being a data selected from an image data and a vocal data;
(d') respectively performing a calculation process upon the two unknown data for assigning each with a weight; and
(e') comparing the assigned weight of the two unknown data while using the comparison as base for selecting one emotion category out of those emotion categories as an emotion recognition result.

10. The method of claim 1, further comprises a step of: (f) performing a learning process with respect to a new unknown data for updating the hyperplanes, and the step (f') further comprises the steps of:
(f1') acquiring a parameter of the hyperplane to be updated;
(f2') transforming the new unknown data into its corresponding characteristic space by the use of the transformation process; and
(f3') using feature values detected from the unknown data and the parameter to update the hyperplanes through an algorithm of iteration.
(f4') when updating the hyperplane, a critical set is determined by using a fixed number of samples close to the hyperplane, and the critical set is defined by $X_i$=arg min $|w \cdot X_i + b|$, wherein the Xi is a number of the samples; the w represents a normal vector of the hyperplane; and the b represents an intercept.

11. The method of claim 9, wherein the transformation process is a Gaussian Kernel transformation.

12. The method of claim 9, wherein each of the emotion categories is an emotion selected from a group consisting of happiness, sadness, surprise, neutral and anger.

13. The method of claim 9, wherein the image data is an image selected from a group consisting of a facial image and a gesture image.

14. The method of claim 9, wherein the image data is comprised of a plurality of feature values, each being defined as a distance between two specific features detected in the image data.

15. The method of claim 9, wherein the vocal data is comprised of a plurality feature values, each being defined as a combination of pitch and energy.

16. The method of claim 9, wherein the calculation process is comprised of the steps of:
basing upon the plurality of training samples used for establishing the corresponding hyperplane to acquire the standard deviation and the mean distance between the plurality of training samples and the hyperplane;
respectively calculating feature distances between the hyperplane and the at least two unknown data to be identified; and
obtaining the weights of the at least two unknown data by normalizing the feature distances, the plurality of training samples, the mean distance and the standard deviation.

17. The method of claim 9, wherein the acquiring of weights of step (d') further comprises the steps of:
(d1') basing on the hyperplanes corresponding to the two unknown data to determine whether the two unknown data are capable of being labeled to a same emotion category; and
(d2') respectively performing the calculation process upon the two unknown data for assigning each with a weight while the two unknown data are not of the same emotion category.

18. A method used for emotion recognition, comprising the steps of:
(a) providing at least two training samples, each of the at least two training samples being defined in a specified characteristic space established by performing a transformation process upon the each of the at least two training samples with respect to its original space;
(b) establishing at least two corresponding hyperplanes in the specified characteristic spaces of the at least two training samples, each of the at least two hyperplanes capable of defining two emotion categories;
(c) inputting at least two unknown data to be identified in correspondence to the at least two hyperplanes, and transforming each unknown data to its corresponding characteristic space by the use of the transformation process while enabling each unknown data to correspond to one emotion category selected from the two emotion categories of the each of the at least two hyperplanes corresponding thereto, and each unknown data being a data selected from an image data and a vocal data;

(d) respectively performing a calculation process, using a computer, upon the two unknown data for assigning each with a weight;

(e) comparing the assigned weight of the two unknown data while using the comparison as base for selecting one emotion category out of a plurality of emotion categories as an emotion recognition result; and (f) performing a learning process with respect to a new unknown data for updating the each of the at least two hyperplanes, and further comprising the steps of:

(f1) acquiring a parameter of the each of the at least two hyperplanes to be updated;

(f2) transforming the new unknown data into its corresponding characteristic space by the use of the transformation process; and (f3) using feature values detected from the unknown data and the parameter to update the each of the at least two hyperplanes through an algorithm of iteration.

(f4) when updating the each of the at least two hyperplanes, a critical set is determined by using a fixed number of samples close to the each of the at least two hyperplanes, and the critical set is defined by, $X_i = \arg\min |w \cdot X_i + b|$, wherein the Xi is a number of the samples, the W represents a normal vector of the each of the at least two hyperplanes, and the b represents an intercept.

19. The method of claim 18, wherein each of the emotion categories is an emotion selected from a group consisting of happiness, sadness, surprise, neutral and anger.

20. The method of claim 18, wherein step (b) further comprises a step of using a means of support vector machine (SVM) to establish the at least two hyperplanes basing upon the at least two training samples.

21. The method of claim 18, wherein the step (a) further comprises the steps of:
(a1) selecting one emotion category out of the two emotion categories;
(a2) acquiring a plurality of feature values according to the selected emotion category so as to form a training sample;
(a3) selecting another emotion category;
(a4) acquiring a plurality of feature values according to the newly selected emotion category so as to form another training sample; and
(a5) repeating steps (a3) and (a4) and thus forming the at least two training samples.

22. The method of claim 18, wherein the image data is an image selected from a group consisting of a facial image and a gesture image.

23. The method of claim 18, wherein the image data is comprised of a plurality of feature values, each of the plurality of feature values being defined as a distance between two specific features detected in the image data.

24. The method of claim 18, wherein the vocal data is comprised of a plurality of feature values, each of the plurality of feature values being defined as a combination of pitch and energy.

25. The method of claim 18, wherein the calculation process of the step (d) further includes the steps of:
basing upon the at least two training samples used for establishing the each of the at least two hyperplanes to acquire a standard deviation and a mean distance between the at least two training samples and the each of the at least two hyperplanes;
respectively calculating feature distances between the at least two hyperplanes and the at least two unknown data to be identified; and
obtaining the weights of the at least two unknown data by performing a mathematic operation upon the feature distances, the at least two training samples, the mean distance and the standard deviation.

26. The method of claim 25, wherein the mathematic operation further comprises the steps of:
obtaining differences between the feature distances and the standard deviation; and
normalizing the differences for obtaining the weights, wherein weights of facial image $Z_{Fi}$ and weights of vocal data $Z_{Ai}$ are obtained wherein $$Z_{Fi} = \frac{D_{Fi} - \sigma_F}{D_{Fave} - \sigma_F}, \text{ for } i = 1 \sim N,$$

and $$Z_{Ai} = \frac{D_{Ai} - \sigma_A}{D_{Aave} - \sigma_A}, \text{ for } i = 1 \sim N;$$

Wherein the $D_{Fave}$ and the $D_{Aave}$ represent average distances between the at least two training samples and the each of the at least two hyperplanes of facial and speech training data respectively; the $\sigma_F$ and the $\sigma_A$ represent standard deviations of facial and speech training data respectively; the $D_{Fi}$ and the $D_{Ai}$ represent distances between the facial and speech test samples and the corresponding each of the at least two hyperplanes respectively.

27. The method of claim 18, wherein the step (d) further includes the steps of:
(d1) basing on the at least two hyperplanes corresponding to the two unknown data to determine whether the two unknown data are capable of being labeled to a same emotion category; and
(d2) respectively performing the calculation process upon the two unknown data for assigning each with a weight while the two unknown data are not of the same emotion category.

28. The method of claim 18, wherein the transformation process is a Gaussian Kernel transformation.

* * * * *